United States Patent
Hassan-Shafique et al.

(10) Patent No.: US 12,449,821 B2
(45) Date of Patent: Oct. 21, 2025

(54) AUTONOMOUS SOURCE LOCALIZATION

(71) Applicant: Novateur Research Solutions, Ashburn, VA (US)

(72) Inventors: Khurram Hassan-Shafique, Ashburn, VA (US); Zeeshan Rasheed, Ashburn, VA (US); Alireza Zaeemzadeh, Ashburn, VA (US); Emmanuel Tung, Ashburn, VA (US); Eric Chen, Ashburn, VA (US)

(73) Assignee: Novateur Research Solutions, Ashburn, VA (US)

( * ) Notice: Subject to any disclaimer, the term of this patent is extended or adjusted under 35 U.S.C. 154(b) by 0 days.

(21) Appl. No.: 18/624,947

(22) Filed: Apr. 2, 2024

(65) Prior Publication Data
US 2025/0306594 A1 Oct. 2, 2025

(51) Int. Cl.
*G05D 1/60* (2024.01)
*G05D 1/223* (2024.01)
(Continued)

(52) U.S. Cl.
CPC .............. *G05D 1/60* (2024.01); *G05D 1/223* (2024.01); *G05D 1/229* (2024.01); *G05D 1/248* (2024.01);
(Continued)

(58) Field of Classification Search
None
See application file for complete search history.

(56) References Cited

U.S. PATENT DOCUMENTS

| | | | |
|---|---|---|---|
| 12,214,806 B2 * | 2/2025 | Cyrus | B60K 17/358 |
| 2023/0304982 A1 * | 9/2023 | Eichenlaub | G01N 33/0062 |
| 2025/0164338 A1 * | 5/2025 | Rezaei | G01M 3/26 |

OTHER PUBLICATIONS

Villa et al., "An Overview of Small Unmanned Aerial Vehicles for Air Quality Measurements: Present Applications and Future Prospectives", Sensors 2016, 16, 1072, Jul. 12, 2016, pp. 1-29 (Year: 2016).*

(Continued)

*Primary Examiner* — Tamara L Weber
(74) *Attorney, Agent, or Firm* — Rahman LLC

(57) ABSTRACT

An autonomous system for detecting, localizing, and potentially deactivating chemical threats or emissions using multiple sensing modalities and reinforcement learning techniques. The system includes visual sensors (e.g., RGB, RGBD, LIDAR), non-visual sensors (e.g., gas concentration, airflow, GPS, RADAR), a neural network architecture and processor to fuse information from different sensors, a module based on deep reinforcement learning for decision making, and a robotic interface for executing actions. The neural network extracts relevant information from sensor streams and encodes them into a joint embedding space. The module considers the current observations, historical data, and previous actions to determine the optimal action for threat localization under partially observable conditions. The system is trained in simulated environments to minimize source localization time while accounting for various constraints. The autonomous system enables effective chemical threat detection and source localization in complex, dynamic environments without endangering human operators.

21 Claims, 21 Drawing Sheets

(51) Int. Cl.
  *G05D 1/229* (2024.01)
  *G05D 1/248* (2024.01)
  *G05D 101/15* (2024.01)
  *G05D 105/80* (2024.01)
  *G05D 111/10* (2024.01)
  *G05D 111/20* (2024.01)
  *G05D 111/30* (2024.01)
  *G05D 111/50* (2024.01)
  *G05D 111/67* (2024.01)

(52) U.S. Cl.
  CPC ..... *G05D 2101/15* (2024.01); *G05D 2105/80* (2024.01); *G05D 2111/17* (2024.01); *G05D 2111/20* (2024.01); *G05D 2111/30* (2024.01); *G05D 2111/56* (2024.01); *G05D 2111/67* (2024.01)

(56) References Cited

OTHER PUBLICATIONS

Husnain et al., "Gas concentration mapping and source localization for environmental monitoring through unmanned aerial systems using model-free reinforcement learning agents", PLOS ONE, Feb. 23, 2024, pp. 1-29 (Year: 2024).*

Uyanik et al., "Next Generation Gas Emission Monitoring System", Society of Petroleum Engineers, SPE Middle East Oil and Gas Show and Conference, Mar. 18-21, 2019, pp. 1-8 (Year: 2019).*

\* cited by examiner

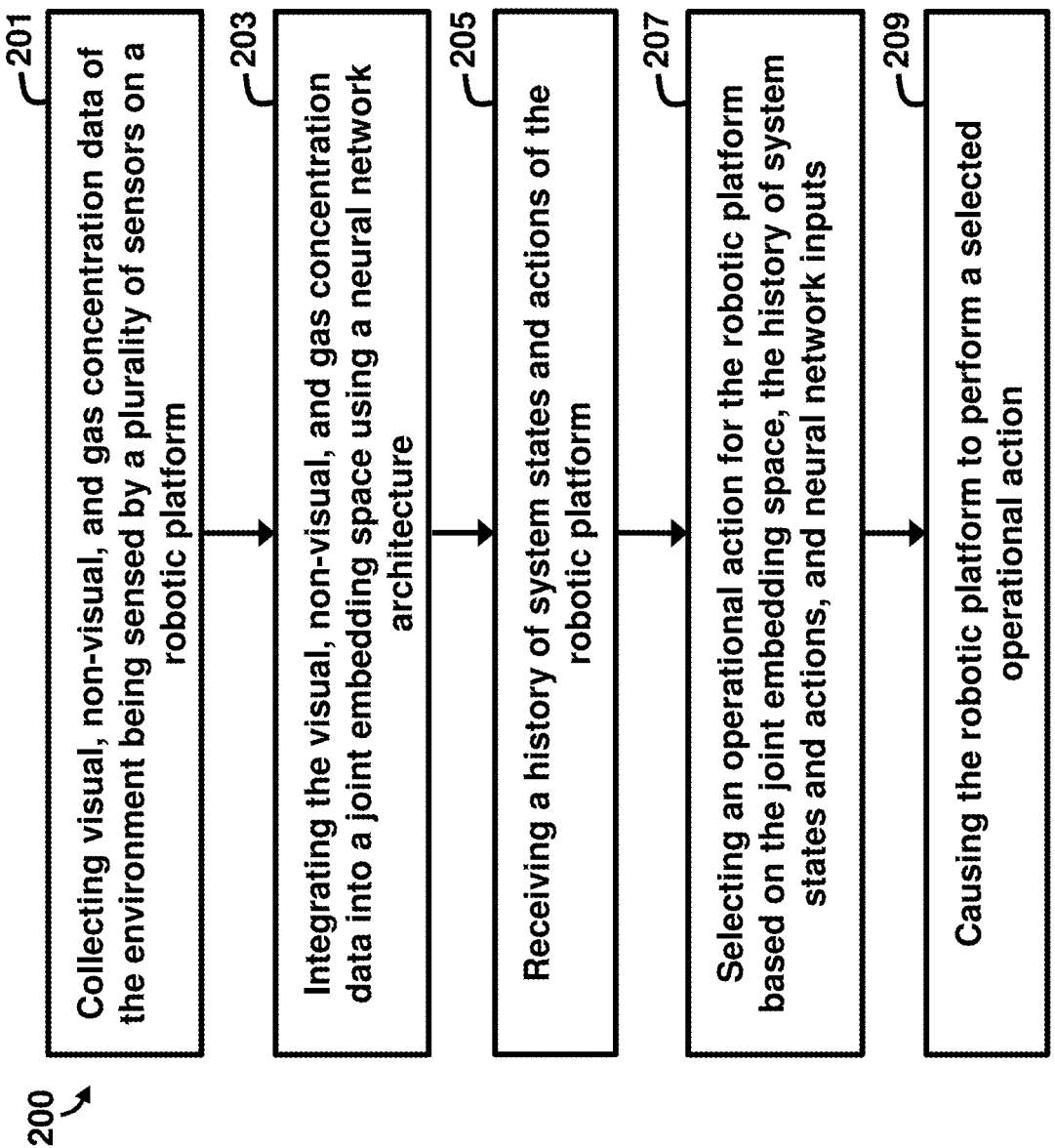

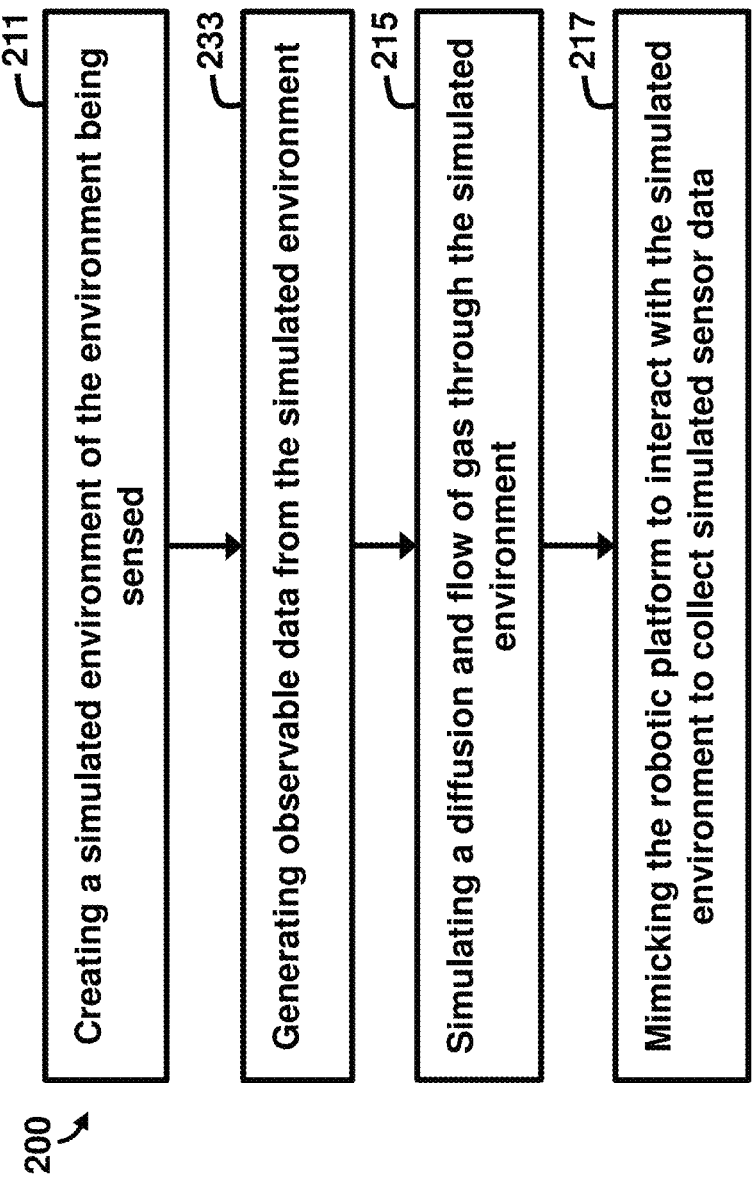

130a

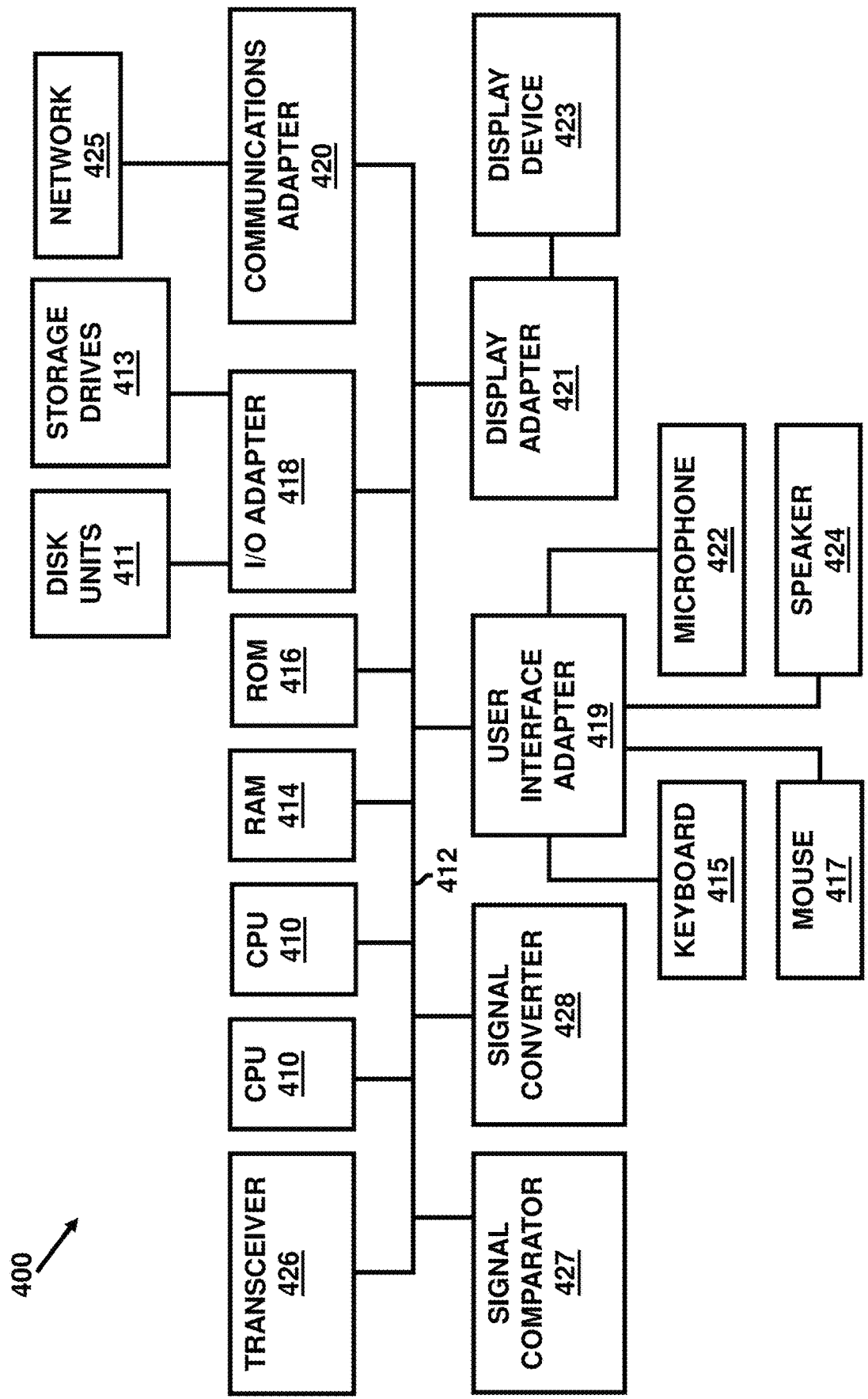

AUTONOMOUS SOURCE LOCALIZATION

GOVERNMENT INTEREST

Aspects of the invention described herein were developed through support under United States Army contract no. W911QX23C0038. The U.S. government may have certain rights in this invention.

BACKGROUND

Technical Field

The embodiments herein generally relate to detection systems, and more particularly to autonomous source localization detection systems.

Description of the Related Art

This background description includes information that may be useful in understanding the present invention. It is not an admission that any of the information provided herein is prior art or relevant to the presently claimed invention or that any publication specifically or implicitly referenced is prior art.

Conventional automated gas source localization systems generally rely on a single sensor modality (e.g., chemical sensor or visual camera) to localize the release source. For instance, some systems use the sensed gas concentration as a cue to navigate the environment and to find the area with the maximum concertation. However, such methods tend to only work in small environments without turbulent airflow and obstacles. In more realistic environments, the existence of turbulent airflow and obstacles leads to patches of trapped gas disconnected from the main plume, and possibly far from the source. In contrast to the state-of-the-art detection methods, biological organisms exploit an array of complimentary sensing modalities to perform the search. Furthermore, memory and attention play key roles in interpreting the sensory input and in optimizing the search.

SUMMARY

In view of the foregoing, an embodiment herein provides an autonomous source localization system comprising a robotic platform comprising a plurality of sensors that collect visual, non-visual, and gas concentration data of an environment being sensed by the plurality of sensors; a module that integrates the visual, non-visual, and gas concentration data into a joint embedding space using a neural network architecture; a processor to: receive the joint embedding space from the module; receive a history of system states and actions of the robotic platform wherein the history of system states and actions comprises a location and orientation of the robotic platform and previous actions taken by the robotic platform; and select an operational action for the robotic platform based on the joint embedding space, the history of system states and actions, and neural network inputs, which may be in the form of the joint embedding space, into the processor. The system further comprises a robotic interface that causes the robotic platform to perform the operational action selected by the processor.

The plurality of sensors may comprise an RGB camera, an RGBD camera, a LIDAR sensor, a RADAR sensor, a gas concentration sensor, an airflow sensor, a GPS sensor, a SONAR sensor, or a combination thereof. The neural network architecture may comprise an encoder-decoder architecture to (i) receive a sequence of historical non-visual and visual observations of the environment, and (ii) generate system actions. The neural network inputs into the processor may provide extracted features from a plurality of sensory data received by the plurality of sensors. Some of these features may be visual features and the plurality of sensory data may be visual sensory data. The neural network architecture may be based on a transformer architecture. The robotic platform may receive guidance instructions from the processor, and the guidance instructions may be input through a user-interface. The user-interface may comprise a hand-held communication device configured to be operable by a user. The robotic platform may be positioned on an unmanned aerial vehicle or a ground vehicle.

The processor may be trained using machine learning using reinforcement learning in a simulated environment or a real environment. The system may comprise a simulator that creates the simulated environment and generates observable data to train the processor, wherein the simulator simulates a diffusion and flow of gas through the simulated environment, and wherein the simulator mimics the robotic platform to interact with the simulated environment to collect simulated sensor data. The operational action selected by the processor may comprise moving the robotic platform, rotating the robotic platform, collecting data from a particular sensor of the plurality of sensors, declaring a location of a source of gas in the environment, or a combination thereof. The processor may identify a chemical compound in the environment being sensed based on the integrated joint embedding space, and the chemical compound may comprise toxic gases, biological agents, chemical agents, hazardous materials, or a combination therein.

Another embodiment provides a method of performing autonomous source localization in an environment being sensed, the method comprising collecting visual, non-visual, and gas concentration data of the environment being sensed by a plurality of sensors on a robotic platform; integrating the visual, non-visual, and gas concentration data into a joint embedding space using a neural network architecture; receiving a history of system states and actions of the robotic platform, wherein the history of system states and actions comprises a location and orientation of the robotic platform and previous actions taken by the robotic platform; selecting an operational action for the robotic platform based on the joint embedding space, the history of system states and actions, and neural network inputs; and causing the robotic platform to perform a selected operational action.

The neural network inputs may provide extracted visual features from visual sensory data received by the plurality of sensors. The neural network inputs may fuse the visual features with non-visual data received by the plurality of sensors and extract cross-modal information. The neural network inputs may map the fused information onto the joint embedding space. The method may comprise creating a simulated environment of the environment being sensed; generating observable data from the simulated environment; simulating a diffusion and flow of gas through the simulated environment; and mimicking the robotic platform to interact with the simulated environment to collect simulated sensor data. The selected operational action may comprise moving the robotic platform, rotating the robotic platform, collecting data from a particular sensor of the plurality of sensors, declaring a location of a source of gas in the environment, or a combination thereof.

Another embodiment provides a computer-readable medium storing instructions for performing autonomous source localization in an environment being sensed, the instructions comprising collecting visual, non-visual, and gas concentration data of the environment being sensed by a plurality of sensors on a robotic platform; integrating the visual, non-visual, and gas concentration data into a joint embedding space using a neural network architecture; receiving a history of system states and actions of the robotic platform, wherein the history of system states and actions comprises a location and orientation of the robotic platform and previous actions taken by the robotic platform; selecting an operational action for the robotic platform based on the joint embedding space, the history of system states and actions, and neural network inputs; and causing the robotic platform to perform a selected operational action.

The instructions may comprise providing extracted visual features from visual sensory data received by the plurality of sensors; fusing the visual features with non-visual data received by the plurality of sensors and extract cross-modal information; and mapping the fused information onto the joint embedding space. The instructions may comprise creating a simulated environment of the environment being sensed; generating observable data from the simulated environment; simulating a diffusion and flow of gas through the simulated environment; and mimicking the robotic platform to interact with the simulated environment to collect simulated sensor data. The instructions may comprise selecting the operational action comprising moving the robotic platform, rotating the robotic platform, collecting data from a particular sensor of the plurality of sensors, declaring a location of a source of gas in the environment, or a combination thereof.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 8A is a flow diagram illustrating a method of performing autonomous source localization, according to an embodiment herein;

FIG. 8B is a flow diagram illustrating other aspects of the method of performing autonomous source localization, according to an embodiment herein;

FIG. 15 is a block diagram illustrating a computer system, according to an embodiment herein.

Figure 1:
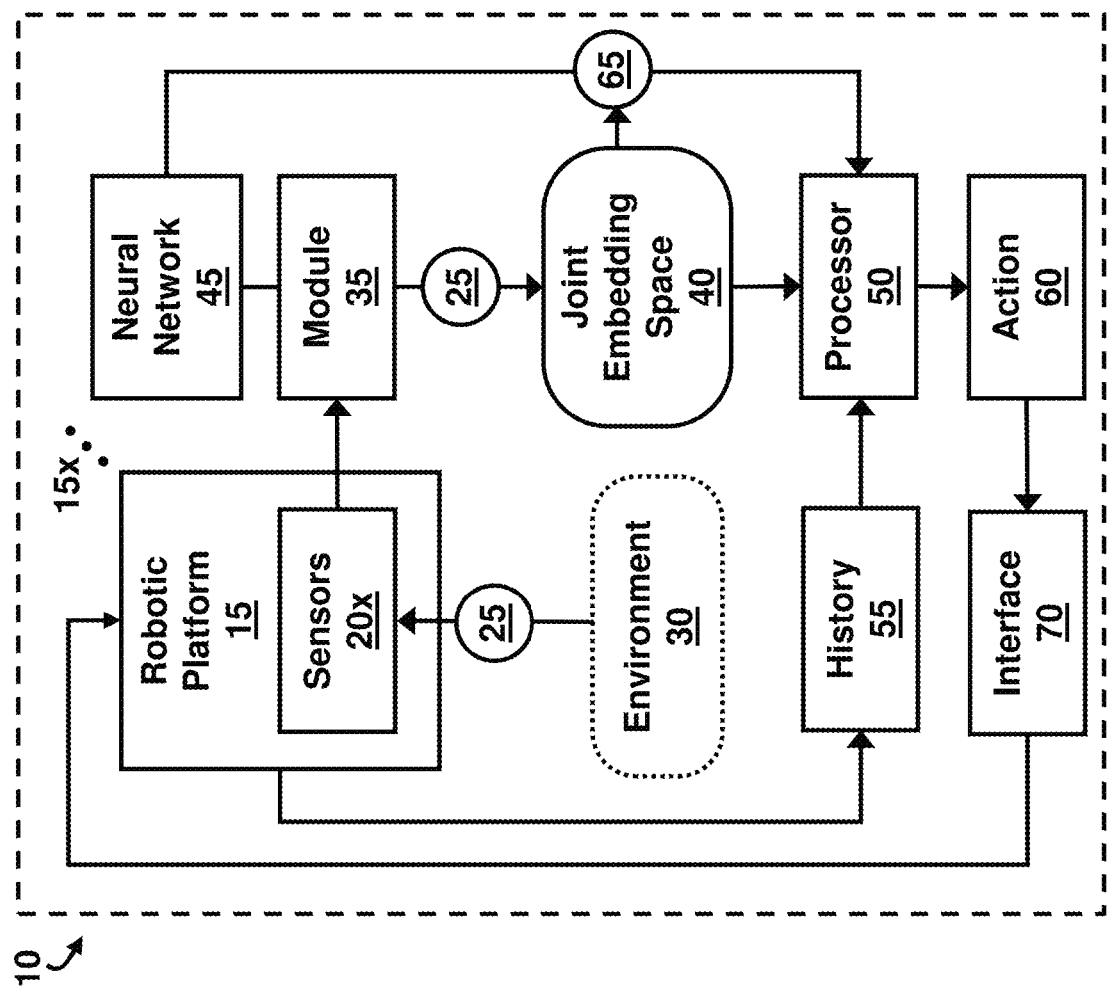
FIG. 1 is a block diagram illustrating an autonomous source localization system, according to an embodiment herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. The following description of particular embodiment(s) is merely exemplary in nature and is in no way intended to limit the scope of the invention, its application, or uses, which can, of course, vary.

It will be understood that when an element or layer is referred to as being "on", "connected to", or "coupled to" another element or layer, it may be directly on, directly connected to, or directly coupled to the other element or layer, or intervening elements or layers may be present. In contrast, when an element or layer is referred to as being "directly on", "directly connected to", or "directly coupled to" another element or layer, there are no intervening elements or layers present. It will be understood that for the purposes of this disclosure, "at least one of X, Y, and Z" or "any of X, Y, and Z" may be construed as X only, Y only, Z only, or any combination of two or more items X, Y, and Z (e.g., XYZ, XY, XZ, YZ).

The description herein describes inventive examples to enable those skilled in the art to practice the embodiments herein and illustrates the best mode of practicing the embodiments herein. Upon reading the following description in light of the accompanying drawing figures, those skilled in the art will understand the concepts of the disclosure and will recognize applications of these concepts not particularly addressed herein.

The terms first, second, etc. may be used herein to describe various elements, but these elements should not be limited by these terms as such terms are only used to distinguish one element from another. For example, a first element could be termed a second element, and, similarly, a second element could be termed a first element, etc. without departing from the scope of the present disclosure. As used herein, the term "and/of" includes any and all combinations of one or more of the associated listed items.

Furthermore, although the terms "final", "first", "second", "upper", "lower", "bottom", "side", "intermediate", "middle", and "top", etc. may be used herein to describe various elements, but these elements should not be limited by these terms. These terms are only used to distinguish one element from another. For example, a first element could be termed an "top" element and, similarly, a second element could be termed a "top" element depending on the relative orientations of these elements.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. "Or" means "and/or." As used herein, the term "and/or" includes any and all combinations of one or more of the associated listed items. It will be further understood that the terms "comprises" and/or "comprising," or "includes" and/or "including" when used herein, specify the presence of stated features, regions, integers, steps, operations, elements, and/or components, but do not preclude the presence or addition of one or more other features, regions, integers, steps, operations, elements, components, and/or groups thereof.

The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

Autonomous searching strategies to localize the emitting source of a chemical compound have various applications such as leak detection in manufacturing facilities, search and rescue missions, resource exploration, locating a lost equipment, chemical or biological attack detection, and law enforcement. Advances in unmanned aerial and ground vehicles make it possible to bring the detection platform closer to the source without endangering the operators. Such robotic systems can be used to detect, localize, and possibly deactivate the emitting source. An autonomous system significantly improves the speed of operation and does not need a human to analyze the incoming stream of data in real-time under severe time constraints. The embodiments herein integrate information from multiple sensory modalities to make decisions in real-time, adaptively navigate a dynamic environment, and strike a balance between the competing goals of environment exploration and fast localization of the target. The embodiments herein provide robotic platforms, such as small quadcopters, equipped with visual and chemical sensors, having the capability to effectively detect and localize chemical threats while allowing the security personnel to monitor the situation at safe distances from the threat. Referring now to the drawings, and more particularly to FIGS. 1 through 15, where similar reference characters denote corresponding features consistently throughout the figures, there are shown preferred embodiments. In the drawings, the size and relative sizes of components, layers, and regions, etc. may be exaggerated for clarity.

In some examples, the processor 50 described herein and/or illustrated in the figures may be embodied as hardware-enabled modules and may be configured as a plurality of overlapping or independent electronic circuits, devices, and discrete elements packaged onto a circuit board to provide data and signal processing functionality within a computer. An example might be a RF switch, antenna tuner, comparator, inverter, or flip-flop, which could include a plurality of transistors and other supporting devices and circuit elements. The modules that are configured with electronic circuits process and/or execute computer logic instructions capable of providing digital and/or analog signals for performing various functions as described herein including controlling the operations of the system 10 and associated components. In some examples, the processor 50 may comprise a central processing unit (CPU) of the system 10. In other examples the processor 50 may be a discrete component independent of other processing components in the system 10. In other examples, the processor 50 may be a semiconductor-based microprocessor, microcontroller, field-programmable gate array (FPGA), hardware engine, hardware pipeline, and/or other hardware-enabled device suitable for receiving, processing, operating, and performing various functions for the system 10. The processor 50 may be provided in the system 10, coupled to the system 10, or communicatively linked to the system 10 from a remote networked location, according to various examples.

The system 10 may be embodied as an electronic device according to an example. For example, the system 10 as embodied as an electronic device may comprise any suitable type of communication device capable of transceiving data. In other examples, system 10 as embodied as an electronic device may comprise a computer, all-in-one (AIO) device, laptop, notebook computer, tablet device, mobile phone, smartphone, electronic book reader, appliance, gaming system, electronic toy, web-based server, local area network server, cloud-based server, etc., among other types of electronic devices that communicate with another device wirelessly.

Furthermore, in some examples, the system 10 may comprise various controllers, switches, processors, and circuits, which may be embodied as hardware-enabled modules and may be a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that include electronic circuits process computer logic instructions capable of providing digital and/or analog signals for performing various functions as described herein. The various functions can further be embodied and physically saved as any of data structures, data paths, data objects, data object models, object files, database components. For example, the data objects could include a digital packet of structured data. Example data structures may include any of an array, tuple, map, union, variant, set, graph, tree, node, and an object, which may be stored and retrieved by computer memory and may be managed by processors, compilers, and other computer hardware components. The data paths can be part of a computer CPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be physical locations in computer memory and can be a variable, a data structure, or a function. Some examples of the modules include relational databases (e.g., such as Oracle® relational databases), and the data objects can be a table or column, for example. Other examples include specialized objects, distributed objects, object-oriented programming objects, and semantic web objects. The data object models can be an application programming interface for creating HyperText Markup Language (HTML) and Extensible Markup Language (XML) electronic documents. The models can be any of a tree, graph, container, list, map, queue, set, stack, and variations thereof, according to some examples. The data object files can be created by compilers and assemblers and contain generated binary code and data for a source file. The database components can include any of tables, indexes, views, stored procedures, and triggers.

Various examples described herein may include both hardware and software elements. The examples that are implemented in software may include firmware, resident software, microcode, etc. Other examples may include a computer program product configured to include a pre-configured set of instructions, which when performed, may result in actions as stated in conjunction with the methods described above. In an example, the preconfigured set of instructions may be stored on a tangible non-transitory computer readable medium or a program storage device containing software code.

FIG. 1 illustrates an autonomous source localization system 10 comprising a robotic platform 15 comprising a plurality of sensors 20$x$ that collect visual, non-visual, and gas concentration data 25 of an environment 30 being sensed by the plurality of sensors 20$x$. The system 10 is configured to autonomously locate and identify the source of a target substance, such as a gas, odor, or chemical, within a given environment 30. The robotic platform 15 serves as a mobile base, allowing for navigation and exploration of the environment 30. In an example, the robotic platform 15 is configured as a movable robot. Furthermore, the system 10 can comprise multiple robotic platforms 15$x$ where each platform 15 can use data from its onboard sensors 20$x$ and stationary sensors 20$i$ (not shown in FIG. 1) and communicate its own output with other platforms 15. Each robotic platform 15 can then use the output from other robotic platforms 15 to recompute its next steps. In this regard, the decision from one robotic platform 15 can help the other robotic platforms 15 navigate the environment 30 more efficiently. Mounted, attached, or otherwise connected on the robotic platform 15 are the plurality of sensors 20$x$ that collect various types of data 25 from the environment 30 being sensed.

According to some examples, the plurality of sensors 20$x$ may include visual sensors such as cameras and depth sensors for capturing visual information from the environment 30, non-visual sensors such as infrared, acoustic, and magnetic sensors for detecting non-visual cues related to the target substance or its source in the environment 30, and gas concentration sensors such as electrochemical, photoionization, and metal oxide semiconductor sensors for measuring the concentration levels of specific gases or volatile organic compounds in the environment 30. In an example, as the robotic platform 15 moves through the environment 30, the plurality of sensors 20$x$ continuously collect visual, non-visual, and gas concentration data 25.

According to the examples, I collected data 25 is used to build a comprehensive understanding of the environment 30 and to detect patterns or gradients that may indicate the presence and location of the target substance's source. In some examples, the system 10 employs algorithms and techniques from fields like robotics, sensor fusion, machine learning, and signal processing to process and analyze the data 25. Some of these techniques may include gradient-based navigation where the robotic platform 15 follows increasing concentration gradients, or mapping techniques to build spatial representations of gas distributions in the environment 30, in some examples.

Other aspects of the system 10 could include multiple cooperating robotic platforms 15$x$, adaptive sensor configurations of the plurality of sensors 20$x$, integration of the system 10 with environmental modeling software, machine learning for pattern recognition and decision making, and communication capabilities to permit remote sensing by keeping humans away from the environment 30 that potentially contains hazardous materials, according to some examples. The embodiments herein span various technologies and applications such as environmental monitoring, hazardous material detection, search and rescue, industrial leak detection, homeland security and more, which enable efficient and safe localization of target substances without direct human intervention in potentially hazardous environments 30, according to some examples.

In some examples, the system 10 includes a module 35 that integrates the visual, non-visual, and gas concentration data 25 into a joint embedding space 40 using a neural network architecture 45. The neural network architecture 45 may be configured as a machine learning model specifically designed to combine and analyze the multimodal data streams represented by the different inputs provided by the plurality of sensors 20x. In an example, the neural network architecture 45 learns to map the high-dimensional sensor data 25 into a lower-dimensional joint embedding space 40, where patterns and relationships between the different modalities can be more easily identified and exploited.

According to an example, the joint embedding space 40 is a vector space that encodes the relevant information from all the sensor modalities in a way that preserves the similarities and correlations between them. Data points that are close together in this embedding space 40 may correspond to similar environmental conditions or patterns detected across the different sensor types of the plurality of sensors 20x. By projecting the sensor data 25 into this joint embedding 40, the module 35 may effectively fuse the information from the plurality of sensors 20x, which allows the system 10 to leverage the complementary strengths of each modality. For example, visual data may provide spatial context, while gas concentration readings indicate the presence and intensity of the target substance, and non-visual sensors can contribute additional environmental cues.

The neural network architecture 45 may be trained on a large dataset of labeled sensor data 25, allowing the neural network architecture 45 to learn the complex mappings and relationships between the different modalities and the presence and characteristics of the target substance's source. During operation, the module 35 continuously updates the joint embedding space 40 as new sensor data 25 is collected, enabling real-time tracking and localization of the source within the environment 30, according to an example.

The system 10 includes a processor 50 to receive the joint embedding space 40 from the module 35; receive a history of system states and actions 55 of the robotic platform 15, wherein the history of system states and actions 55 comprises a location and orientation of the robotic platform 15 and previous actions taken by the robotic platform 15; and select an operational action 60 for the robotic platform 15 based on the joint embedding space 40, the history of system states and actions 55, and neural network inputs 65 into the processor 50. In an example, the history 55 comprises a record of the location and orientation of the robotic platform 15 at different time steps, as well as the previous actions taken by the robotic platform 15, such as movements, sensor adjustments, or other operational decisions.

According to an example, the processor 50 utilizes this historical context, represented by the system states and actions 55, in conjunction with the current multimodal information encapsulated in the joint embedding space 40, to select an appropriate operational action 60 for the robotic platform 15 to execute next. To make this decision, the processor 50 employs a sophisticated neural network architecture 45 that takes the joint embedding space 40, the history of system states and actions 55, and potentially other neural network inputs 65 as inputs, according to some examples. These additional neural network inputs 65 could include environmental models, mission parameters, or any other relevant contextual information that may influence the decision-making process.

The neural network architecture within the processor 50 may be configured as a deep reinforcement learning model or a recurrent neural network (RNN) that has been trained on a large dataset of simulated or real-world scenarios. This training process allows the neural network architecture 45 to learn the optimal mapping between the input state representations (e.g., joint embedding space 40, system history 55, and other inputs 65) and the actions 60 that should be taken by the robotic platform 15 to effectively localize and navigate towards the source of the target substance in the environment 30, according to some examples.

During operation, the processor 50 continuously updates its internal state representation based on the incoming data streams and selects the most appropriate operational action 60 for the robotic platform 15 to execute, in an example. These actions 60 could include, for example, movements in specific directions, adjustments to sensor configurations, deployment of additional sensors or probes, or even coordinated actions with other robotic platforms 15 in a multi-agent system. The processor 50 effectively acts as the decision-making brain of the system 10, leveraging the fused multimodal data 25 from the plurality of sensors 20x, the historical context, and its learned knowledge to intelligently guide the robotic platform 15 towards the source of the target substance in the environment 30 in an efficient and autonomous manner, according to an example.

The system 10 includes a robotic interface 70 that causes the robotic platform 15 to perform the operational action 60 selected by the processor 50. According to an example, the robotic interface 70 serves as the operational bridge between the decision-making capabilities of the processor 50 and the physical execution of actions 60 performed by the robotic platform 15. For example, the robotic interface 70 receives the operational action 60 selected by the processor 50 based on the analysis of the joint embedding space 40, the history of system states and actions 55, and any other neural network inputs 65. This operational action 60 could range from simple movements in a particular direction to more complex actions like adjusting sensor configurations, deploying additional probes, or coordinating with other robotic platforms 15.

For example, the robotic interface 70 is responsible for translating the high-level operational action 60 into a sequence of low-level commands and control signals that can be directly executed by the robotic platform's 15 actuators, sensors, and other hardware components. This translation process may involve mapping the abstract action representation used by the processor 50 to the specific kinematic, dynamic, and control constraints of the robotic platform 15.

Depending on the complexity of the robotic platform 15 and the range of actions it can perform, the robotic interface 70 may incorporate various components (not shown) such as motion planners, trajectory generators, inverse kinematics solvers, and low-level control loops. These components can work together to generate feasible and safe trajectories, account for obstacles and environmental constraints, and ensure smooth and precise execution of the desired actions 60.

The robotic interface 70 may also handle error handling, safety checks, and feedback loops to monitor the execution of the operational action 60 and make necessary adjustments or report any issues back to the processor 50. According to an example, this closed-loop control and monitoring capability ensures that the system 10 can adapt and respond to unexpected events or deviations from the planned actions. In some implementations, the robotic interface 70 may incorporate machine learning capabilities, such as adaptive control or reinforcement learning, to continuously refine and optimize the translation of high-level actions to low-level commands based on feedback and experience gained during operation.

Accordingly, the robotic interface 70 acts as a link between the intelligent decision-making processes of the processor 50 and the physical manifestation of those decisions through the robotic platform 15, according to an example. The design and implementation of the robotic interface 70 may help ensure accurate, safe, and efficient execution of the selected operational actions 60, ultimately enabling the autonomous source localization system 10 to effectively navigate and localize the source of the target substance in the environment 30.

Figure 2:
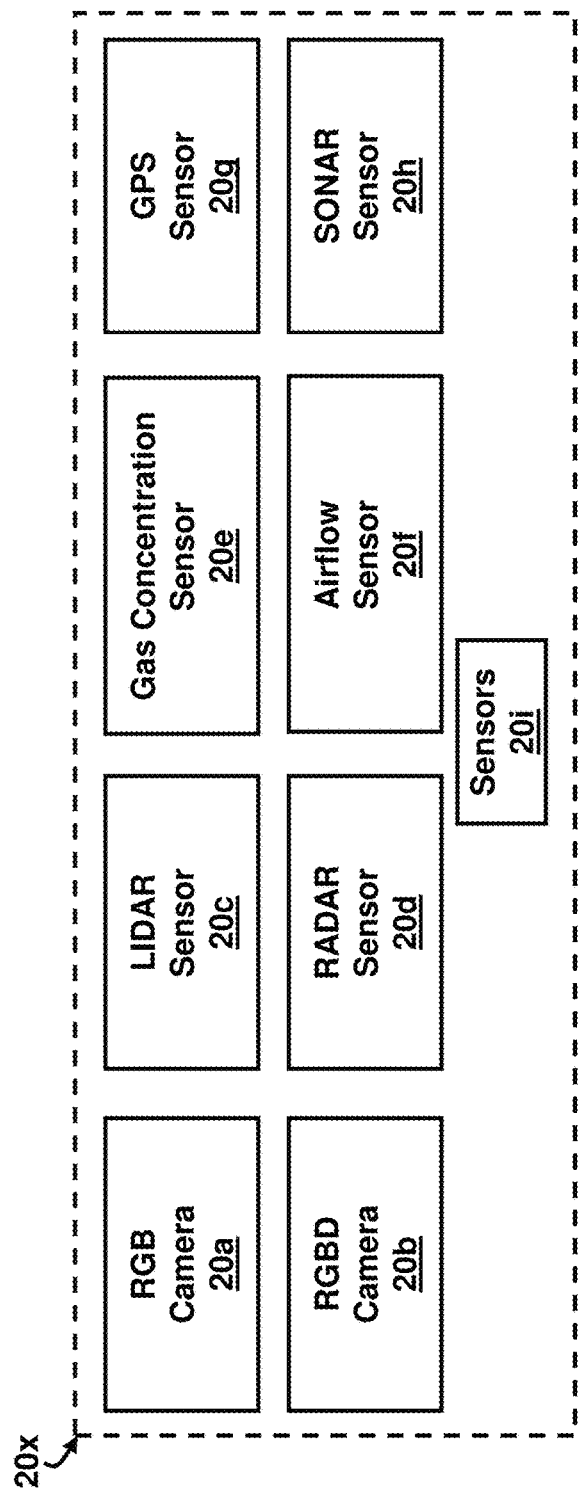
FIG. 2 is a block diagram illustrating examples of the plurality of sensors of the autonomous source localization system of FIG. 1, according to an embodiment herein.

FIG. 2, with reference to FIG. 1, illustrates that the plurality of sensors 20x may comprise an RGB camera 20a, an RGBD camera 20b, a LIDAR sensor 20c, a RADAR sensor 20d, a gas concentration sensor 20e, an airflow sensor 20f, a GPS sensor 20g, a SONAR sensor 20h, or a combination thereof. Furthermore, the plurality of sensors 20x may include other types of sensors not specifically mentioned above and which may aid in the detection of various aspects of the environment 30. For example, the system 10 may comprise other stationary sensors 20i (visual/non-visual/gas sensors) that can send data 25 to the platform 15 (e.g., using a WiFi® signal, etc.). The system 10 can use the data 25 from the stationary sensors 20i in addition to the onboard sensors 20a-20h. The plurality of sensors 20x may be arranged in any suitable configuration including in an array, autonomous configuration, linked configuration, or any other arrangement to collect complementary data streams that enable comprehensive environmental perception and analysis of the environment 30.

The RGB camera 20a may be a color camera that captures visible light imagery, providing detailed visual information about the environment's appearance, textures, and colors. The RGBD camera 20b may, in addition to color data, also capture depth information, allowing for the construction of 3D point clouds and dense surface models of the environment 30. For example, this depth data can aid in obstacle detection, terrain mapping, and spatial reasoning.

The LIDAR sensor 20c may be a Light Detection and Ranging (LIDAR) sensor that emits laser pulses and measures the time-of-flight of the reflected signals to create highly accurate 3D point clouds of the environment. LIDAR data is particularly useful for detecting and mapping static structures, obstacles, and terrain features. The RADAR Sensor 20d may be a Radio Detection and Ranging (RADAR) sensor that uses radio waves to detect and track moving objects, providing valuable information about the presence and dynamics of potential targets or obstacles in the environment 30.

The gas concentration sensor 20 may be specifically configured to measure the concentration levels of various gases or volatile organic compounds (VOCs) in the air in the environment 30. Different sensor technologies, such as electrochemical, photoionization, or metal oxide semiconductor sensors, can be employed to target specific substances of interest. In an example, the airflow sensor 20f measures wind speed, direction, and turbulence, and can provide insights into the dispersion patterns and transport mechanisms of gaseous substances in the environment 30, aiding in source localization efforts.

The GPS sensor 20g may be a Global Positioning System (GPS) sensor that provides accurate positioning and navigation data, enabling the system 10 to track the location and movements of the robotic platform 15, as well as to geo-reference sensor data 25 for mapping and spatial analysis purposes. The SONAR sensor 20h may be a Sound Navigation and Ranging (SONAR) sensor that uses acoustic waves to detect and map objects in the environment 30, particularly in aquatic or underground settings where other sensors may be less effective.

The plurality of sensors 20x can be employed in various combinations, depending on the specific requirements of the target environment 30, the characteristics of the substance(s) being localized, and the desired level of redundancy and robustness in the data collection process. In an example, I fusion and analysis of data 25 from the plurality of sensors 20x enable the system 10 to leverage complementary strengths, such as the high-resolution visual and spatial data from cameras 20a, 20b and LIDAR sensor 20c, the ability to detect moving targets with RADAR sensor 20d, the specific gas composition information from concentration sensor 20e, and the environmental context provided by airflow, GPS, and SONAR sensors 20f-20h. By intelligently integrating and interpreting these multimodal data streams, the system 10 can build a comprehensive understanding of the environment 30, detect patterns and gradients that may lead to the source of the target substance, and navigate effectively while accounting for obstacles, terrain features, and other complex environmental factors in real-time.

Figure 3:
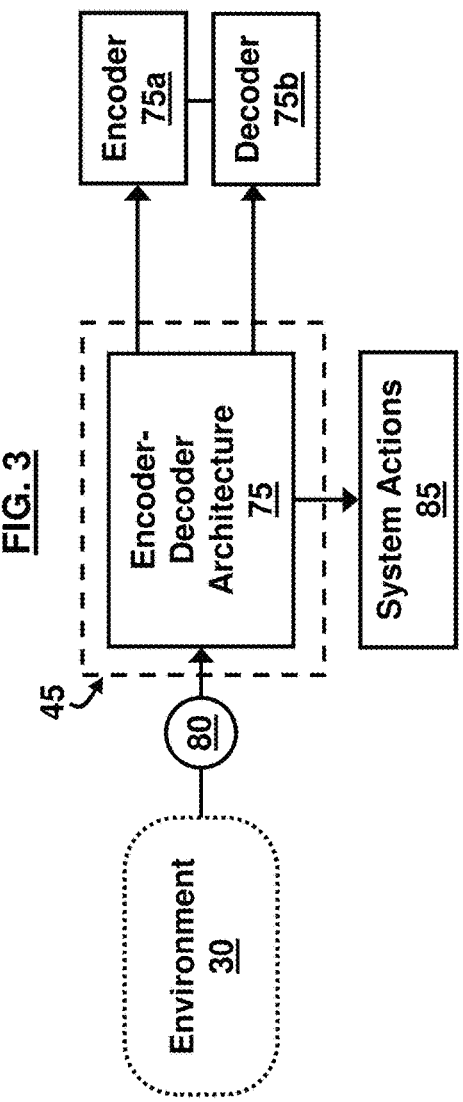
FIG. 3 is a block diagram illustrating an example of the neural network architecture of the autonomous source localization system of FIG. 1, according to an embodiment herein.

FIG. 3, with reference to FIGS. 1 and 2, illustrates that the neural network architecture 45 may comprise an encoder-decoder architecture 75 to (i) receive a sequence of historical non-visual and visual observations 80 of the environment 30, and (ii) generate system actions 85. This type of architecture 75 may be particularly well-suited for processing sequential data and generating outputs based on the historical context.

The encoder-decoder architecture 75 may comprise an encoder 75a and a decoder 75b. For example, the encoder 75a is responsible for taking the sequence of historical non-visual and visual observations 80 of the environment 30 as input and encoding them into a compressed latent representation. These historical observations 80 can include time-series data from the LIDAR sensor 20c, RADAR sensor 20d, SONAR sensor 20h, gas concentration sensor 20e, airflow sensor 20f, and visual sensors such as the RGB and RGBD cameras 20a, 20b as well as LIDAR sensor 20c. In an example, the encoder 75a processes this sequence of multimodal observations 80, capturing the temporal dependencies and extracting the relevant features and patterns that characterize the evolving environmental conditions and the presence of the target substance in the environment 30. In an example, the resulting latent representation encodes the salient information from the historical observations in a compact form. According to an example, the decoder 75b of the architecture 75 takes this latent representation as input and generates system actions 85 for the robotic platform 15. These system actions 85 can include navigation commands, sensor adjustments, or other operational decisions that are informed by the historical context encoded in the latent representation.

The encoder-decoder architecture 75 may be trained on a large dataset of simulated or real-world scenarios, using techniques such as supervised learning or reinforcement learning. In an example, during training, the neural network 45 learns to map the sequences of historical observations 80 to the appropriate system actions 85 that would enable effective source localization and navigation. One aspect of using an encoder-decoder architecture 75 is its ability to handle variable-length input sequences, allowing the system 10 to consider arbitrary histories of observations and adapt its decision-making accordingly, for example. Additionally, the latent representation learned by the encoder 75a can capture long-range dependencies and complex relationships in the data, enabling the system 10 to make informed decisions based on the cumulative historical context.

The decoder 75b can also be designed to generate the sequences of actions 85, allowing for multi-step planning and decision-making, rather than just producing a single action at a time. This can be particularly useful when coordinating the actions 85 of multiple robotic platforms 15x or when executing complex maneuvers during source localization. Furthermore, the encoder-decoder architecture 75 can be enhanced with attention mechanisms, which allow the model to selectively focus on the most relevant parts of the historical observations 80 when generating system actions 85, thereby improving system performance and interpretability. By leveraging the powerful capabilities of the encoder-decoder architecture 75, the system 10 can effectively integrate and reason over the rich and varied, multimodal sensor data streams provided by the plurality of sensor 20x, thereby enabling intelligent decision-making and adaptive behavior in complex, dynamic environments.

Figure 4:
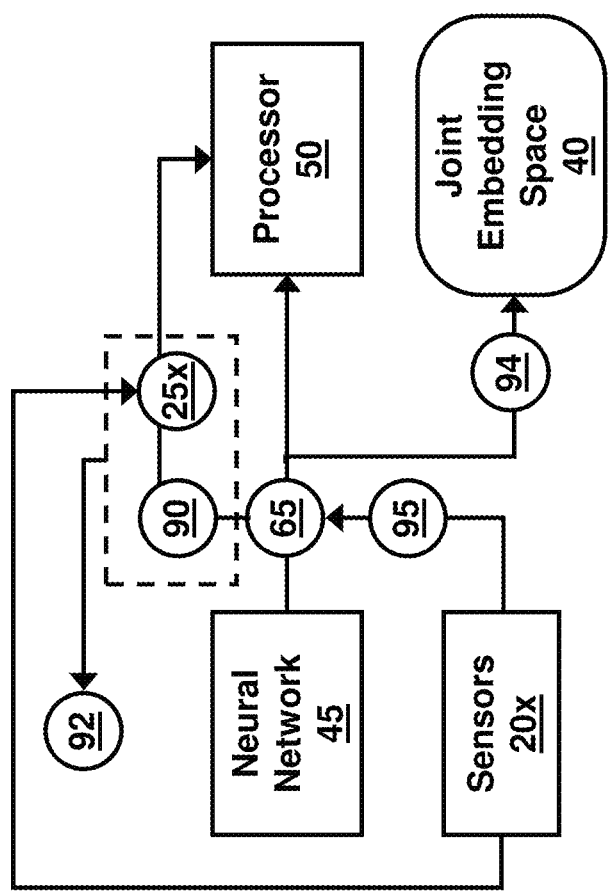
FIG. 4 is a block diagram illustrating aspects of the neural network inputs of the autonomous source localization system of FIG. 1, according to an embodiment herein.

FIG. 4, with reference to FIGS. 1 through 3, illustrates that the neural network inputs 65 into the processor 50 may provide extracted visual features 90 from visual sensory data 95 received by the plurality of sensors 20x. The neural network inputs 65 into the processor 50 may help in enabling the system 10 to effectively leverage the varied multimodal data 25 collected by the plurality of sensors 20x. These inputs 65 can provide various forms of preprocessed and fused information to the decision-making neural networks 45 within the processor 50. One aspect of the neural network inputs 65 is the extraction of visual features 90 from the visual sensory data 95 received by sensors such as RGB cameras 20a, RGBD cameras 20b, as well as others. These visual features 90 can include low-level characteristics like edges, textures, and colors, as well as higher-level semantic information such as object detection, segmentation, and scene understanding. The extraction of visual features 90 may be performed by dedicated convolutional neural networks (CNNs) or other deep learning architectures specifically designed for computer vision tasks. In an example, these models are trained on large datasets of labeled visual data to learn hierarchical representations that capture the most informative and discriminative aspects of the visual input.

However, the neural network inputs 65 may go beyond just visual feature extraction. They can also play a crucial role in fusing and integrating information from multiple modalities. Specifically, the neural network inputs 65 may fuse the visual features 90 with non-visual data 25x received by the plurality of sensors 20x and extract cross-modal information 92. This fusion process may involve combining the complementary information from different modalities in a way that preserves the cross-modal relationships and dependencies. The resulting cross-modal information 92 can capture complex interactions between visual cues and non-visual measurements, providing a more comprehensive understanding of the environment 30 and the target substance's behavior. The fusion of multimodal data 25 can be achieved through various techniques, such as concatenation, element-wise operations, or more sophisticated fusion architectures like multimodal transformers or cross-modal attention mechanisms, according to some examples. In an example, these approaches allow the neural network inputs 65 to effectively integrate and reason over the diverse data streams collected by the plurality of sensors 20x.

The neural network inputs 65 may map fused information 94, which can include both the cross-modal information 92 and any additional contextual or historical data onto the joint embedding space 40. In an example, this mapping process enables the representation of the complex multimodal data 25 in a common, low-dimensional space where patterns and relationships can be more easily identified and exploited by the downstream decision-making processes within the processor 50. The joint embedding space 40 can be learned through various techniques such as metric learning, contrastive learning, or generative adversarial networks, which aim to preserve the relevant information and structure from the high-dimensional sensor data 25 while projecting it into a more compact and interpretable representation. By providing these varied, fused, and cross-modal neural network inputs 65 to the processor 50, the system 10 can leverage the full potential of its diverse plurality of sensors 20x, enabling more informed and intelligent decision-making for effective source localization and navigation in complex environments 30.

Figure 5:
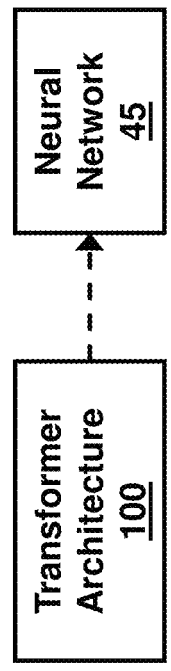
FIG. 5 is a block diagram illustrating an example of the neural network architecture of the autonomous source localization system of FIG. 1, according to an embodiment herein.

FIG. 5, with reference to FIGS. 1 through 4, illustrates that the neural network architecture 45 may be based on a transformer architecture 100. For example, the neural network architecture 45 employed by the module 35 to integrate the multimodal sensor data 25 into the joint embedding space 40 may be based on a transformer architecture 100. Transformer models have gained significant popularity in various domains, including natural language processing, computer vision, and multimodal learning, due to their ability to effectively capture long-range dependencies and model complex relationships within sequential data.

The transformer architecture 100 may be a type of encoder-decoder model that relies primarily on attention mechanisms, rather than the more traditional recurrent or convolutional neural network components. In an example, the core building block of a transformer is the self-attention layer, which allows the model to weigh and aggregate information from different positions within the input sequence, enabling it to learn contextual relationships and dependencies. In the context of the autonomous source localization system 10, the transformer architecture 100 can be adapted to process the sequences of multimodal observations from the plurality of sensors 20x. The input to the transformer encoder could be a series of concatenated or interleaved observations from different sensor modalities, such as visual data from RGB and RGBD cameras 20a, 20b, point clouds from the LIDAR and RADAR sensors 20d, gas concentration measurements from the gas concentration sensor 20e, airflow data from the airflow sensor 20f, and any other relevant sensor readings.

According to an example, the self-attention layers within the transformer encoder would then learn to selectively attend to the most relevant parts of the input sequence, capturing the complex interplay between different modalities and the temporal dynamics of the observed environment. In an example, this allows the model to effectively integrate and reason over the varied, multimodal data streams collected by the plurality of sensors 20x in the system 10. Additionally, the transformer architecture 100 can incorporate cross-modal attention mechanisms, which enable the model to explicitly model the relationships between different modalities. For example, cross-modal attention could help associate visual features with corresponding gas concentration gradients or airflow patterns, providing a more coherent understanding of the environment and the target substance's behavior. The output of the transformer encoder can then be used to initialize the latent representation, which is subsequently processed by the transformer decoder to generate the desired system actions or predictions, such as navigation commands, sensor adjustments, or source localization estimates.

In an example, one aspect of using a transformer architecture 100 is its ability to efficiently model long-range dependencies and capture global context, which is helpful for source localization tasks that may involve complex, dynamic environments and extended observation sequences. Additionally, the transformer's attention mechanisms can provide interpretability by highlighting the most relevant regions or modalities that contributed to a particular decision or prediction. Furthermore, transformer models can be easily scaled and parallelized, allowing them to leverage the computational power of modern hardware accelerators such as graphics processing units (GPUs) and tensor processing units (TPUs), enabling efficient training and inference on large-scale multimodal datasets. By leveraging the powerful capabilities of the transformer architecture 100, the system 10 can effectively integrate and reason over the diverse, multimodal sensor data 25, enabling more intelligent and adaptive decision-making for effective source localization and navigation in complex, dynamic environments 30.

Figure 6:
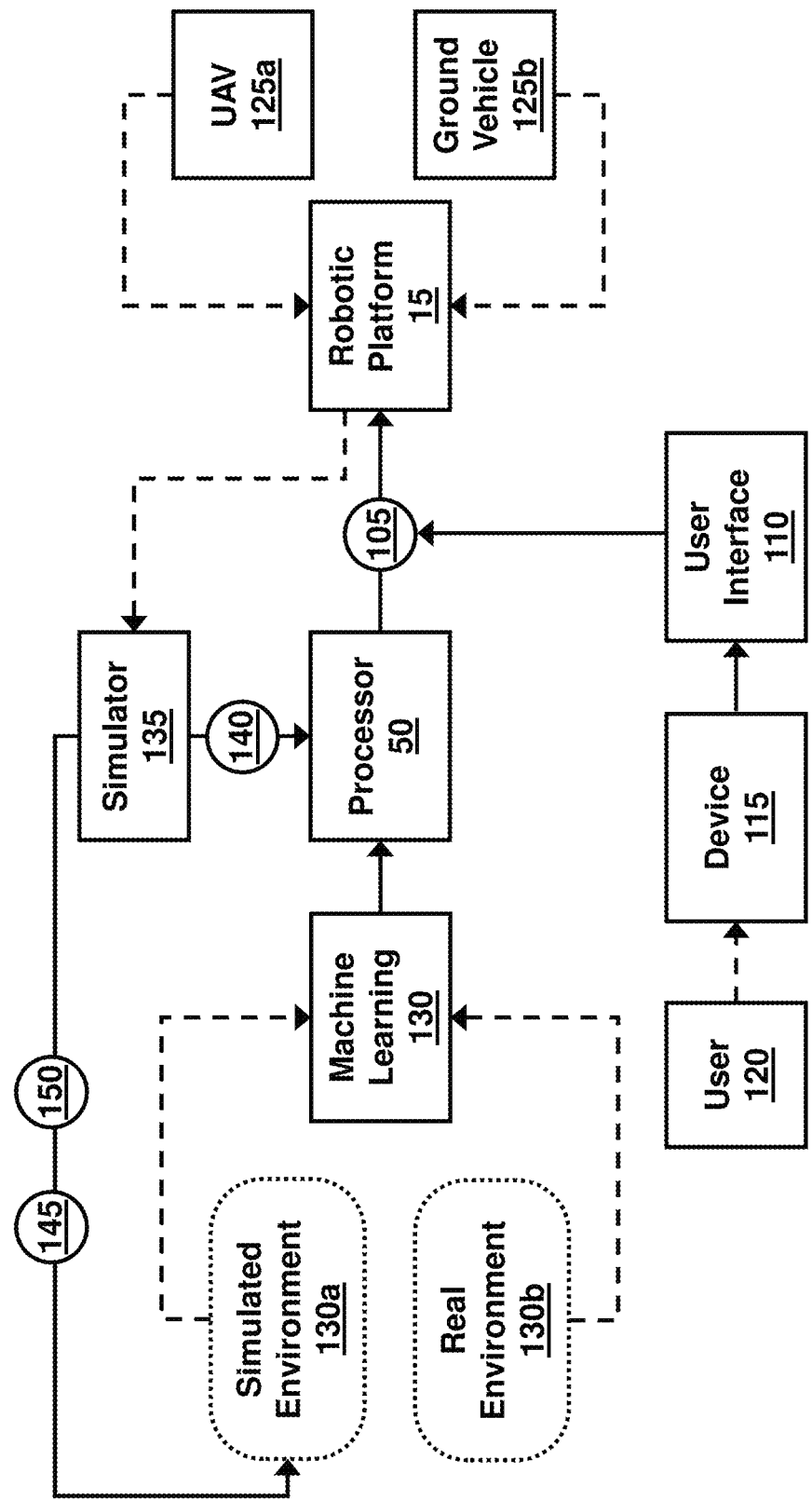
FIG. 6 is a block diagram illustrating further aspects of the autonomous source localization system of FIG. 1, according to an embodiment herein.

FIG. 6, with reference to FIGS. 1 through 5, illustrates that the robotic platform 15 may receive guidance instructions 105 from the processor 50, and the guidance instructions 105 may be input through a user-interface 110. The user-interface 110 may comprise a hand-held communication device 115 configured to be operable by a user 120. While the system 10 may be configured to operate autonomously, it may also incorporate provisions for human guidance, feedback, and oversight through the use of the user-interface 110. In an example, the interface 110 allows the user 120, such as a remote operator or on-site personnel, to provide the guidance instructions 105 to the robotic platform 15, enabling a level of human-in-the-loop control and supervision.

The guidance instructions 105 from the user 120 can be received by the processor 50 and integrated into the decision-making process, potentially overriding or modifying the autonomous actions selected by the neural network 45. These instructions may include high-level mission objectives, waypoint navigation commands, sensor configuration adjustments, or even direct teleoperation of the robotic platform 15 in challenging or high-risk situations. The user-interface 110 through which the guidance instructions 105 are input can take various forms, depending on the deployment scenario and the level of communication infrastructure available. In one implementation, the user-interface 110 may comprise a hand-held communication device 115 configured to be operable by the user 120.

This hand-held communication device 115 can be a ruggedized tablet, smartphone, or a dedicated control unit designed for field use, according to various examples. The device 115 may feature a graphical user interface (GUI) that displays real-time sensor data, environmental maps, and the current status of the robotic platform 15. The user 120 can interact with the interface 110 through touch inputs, voice commands, or physical controls to issue guidance instructions 105. The hand-held communication device 115 may also incorporate augmented reality (AR) or mixed reality (MR) capabilities, allowing the user 120 to visualize the position of the robotic platform 15, sensor data 25, and potential source locations overlaid onto a live video feed or a 3D environmental model. This can enhance situational awareness and facilitate more intuitive and informed decision-making.

In scenarios where a direct line-of-sight or close proximity is not required, the user-interface 110 could be a remote-control station or a command center, operatively connected to the robotic platform 15 through secured wireless or wired communication links. For example, this would enable remote experts or decision-makers to monitor and guide the source localization operations from a safe location. Additionally, the user-interface 110 may incorporate features for multi-user collaboration, allowing multiple operators or subject matter experts to coordinate and share their inputs, enabling more effective team-based decision-making and mission planning. The integration of the user-interface 110 and the ability to receive guidance instructions 105 from the user 120 can provide a level of human oversight and control to the autonomous source localization system 10. This can be particularly valuable in complex or high-risk scenarios, where human judgment and domain expertise can complement the autonomous capabilities of the system, ensuring safer and more effective source localization operations.

The system 10 can be deployed on various mobile robotic platforms 15$x$ to enable effective navigation and exploration of diverse environments 30. For example, the robotic platform 15 may be positioned on an unmanned aerial vehicle (UAV) 125$a$ or a ground vehicle 125$b$, depending on the specific requirements and characteristics of the operating environment 30. In a scenario utilizing a UAV 125$a$, the robotic platform 15 can be integrated with the UAV 125$a$, such as a multirotor drone, fixed-wing aircraft, or a hybrid design. In an example, this configuration enables the system 10 to conduct aerial surveys and reconnaissance missions, providing a broader coverage area and the ability to access hard-to-reach or elevated locations or environments 30.

The UAV 125$a$ can be equipped with specialized landing gear or docking mechanisms to securely accommodate the robotic platform 15 and the plurality of sensors 20$x$. The robotic platform 15 may also be configured for detachment and deployment from the UAV 125$a$, allowing the robotic platform 15 to conduct more localized, ground-based investigations of the environment 30 once a potential source area has been identified from the air. The combination of aerial mobility and the autonomous source localization capabilities of the robotic platform 15 can be particularly advantageous in scenarios such as detecting and tracking airborne contaminants, locating chemical or gas leaks in industrial facilities, or conducting environmental monitoring in remote or hazardous areas.

In a scenario utilizing a ground vehicle 125$b$, the robotic platform 15 may be positioned on a ground vehicle 125$b$, such as a wheeled, tracked, or legged vehicle or platform. The ground vehicle 125$b$ may include on ground, below ground, on water, or below water vehicles according to various examples. For example, the use on a ground vehicle 125$b$ enables the system 10 to navigate and operate in various environments 30 including terrestrial environments, potentially traversing rough terrain, urban areas, or indoor facilities. The ground vehicle 125$b$ can provide enhanced mobility, payload capacity, and endurance compared to aerial platforms, allowing for extended missions and the deployment of additional sensors or equipment as needed. The ground vehicle 125$b$ may also incorporate specialized locomotion systems, such as articulated suspensions or multi-mode mobility configurations, to adapt to varying terrain conditions. In applications like underground mine exploration, urban search and rescue operations, or industrial site inspections, the ground-based deployment of the robotic platform 15 can offer improved stability, maneuverability, and proximity to potential sources, enabling more accurate and reliable source localization.

Both the UAV 125a and ground vehicle 125b configurations can be further augmented with additional features and capabilities to enhance the performance and versatility of the system 10. These may include (i) Hybrid mobility solutions, combining aerial and ground-based platforms for multistage missions or cooperative operations; (ii) Modular sensor suites tailored to specific target substances or environmental conditions; (iii) Advanced navigation and situational awareness systems, such as simultaneous localization and mapping (SLAM) or global positioning system (GPS) integration; (iv) Robust communication links and data transmission capabilities for remote operation and coordination; and (v) Onboard processing power and edge computing capabilities for real-time data analysis and decision-making, according to various examples. By leveraging the mobility and deployment options provided by unmanned aerial vehicles 125a and ground vehicles 125b, the autonomous source localization system 10 can adapt to a wide range of operational scenarios, enabling efficient and effective source detection and localization in diverse and challenging environments.

The processor 50 may be trained using machine learning 130 using reinforcement learning in a simulated environment 130a or real environment 130b. The system 10 may comprise a simulator 135 that creates the simulated environment 130a and generates observable data 140 to train the processor 50. According to an example, the processor 50 may undergo a comprehensive training process using advanced machine learning techniques 130, with a focus on reinforcement learning algorithms. The training may be conducted in two distinct settings: the simulated environment 130a and the real environment 130b, each offering unique aspects for optimizing the decision-making capabilities of the processor 50 in the context of autonomous chemical threat localization in an environment 30.

According to an example, to facilitate training in the simulated environment 130a, the system 10 incorporates a sophisticated simulator 135. In an example, the simulator 135 is configured to create a high-fidelity virtual replica of the real-world environment 30 in which the robotic platform 15 is intended to operate. The simulated environment 130a may be meticulously crafted to encompass all relevant aspects of the physical world, including the layout of the area, obstacles, atmospheric conditions, and the dynamic behavior of gas dispersion.

According to some examples, the simulator 135 may be a software or hardware system that creates a virtual or simulated environment 130a to imitate the behavior and characteristics of a real-world system such as environment 30, process, or phenomenon. The simulator 135 may be utilized to predict the performance of complex systems without the need for physical prototypes or real-world experiments. The simulator 135 may include mathematical models, computational algorithms, input data and parameters, user interfaces and visualizations, output data and analysis tools, and software and hardware infrastructure, according to various examples.

Mathematical models: At the core of the simulator 135 are mathematical models that describe the behavior and interactions of the system (i.e., environment 30) being simulated. These models may be based on the underlying physical laws, equations, and principles governing the system (i.e., environment 30).

Computational algorithms: The simulator 135 employs computational algorithms to solve the mathematical models numerically. These algorithms may discretize the system (i.e., environment 30) into smaller elements (such as grid cells or mesh nodes) and apply the governing equations to each element to compute the state variables (e.g., velocity, pressure, temperature) at each point in space and time. Common computational methods used in simulators include finite difference, finite element, and finite volume methods.

Input data and parameters: The simulator 135 may utilize input data and parameters to define the initial and boundary conditions of the system (i.e., environment 30) being simulated. These inputs may include the geometry of the environment, material properties, initial conditions (e.g., gas concentration, temperature), and external forces or stimuli. The accuracy and reliability of the simulation may depend on the quality and completeness of the input data.

User interface and visualization: The simulator 135 may provide a user interface (which could be the same user interface 110 described above or may be a different user interface) that allows users to set up simulations, input parameters, and control the simulation process. The user interface may include graphical tools for defining the geometry, setting boundary conditions, and specifying simulation settings. Additionally, the simulator 135 may include visualization capabilities to display the simulation results, such as plots, animations, or 3D renderings of the system's (i.e., environment 30) behavior over time.

Output data and analysis tools: The simulator 135 generates output data that can be used to analyze and interpret the system's (i.e., environment 30) behavior. The output data may include time-series data, spatial distributions, or statistical metrics. The simulator 135 may also provide analysis tools and post-processing capabilities to help users extract meaningful insights from the simulation results, such as calculating average values, detecting patterns, or comparing different scenarios.

Software and hardware infrastructure: The simulator 135 may utilize a computing software and hardware infrastructure to run the simulations efficiently. This may include high-performance computers, parallel processing capabilities, and specialized software libraries or frameworks for numerical computations and data management. The software and hardware requirements depend on the complexity and scale of the simulations being performed.

The simulator 135 can vary in complexity and scope, ranging from simple, single-component models to highly complex, multi-physics simulations that integrate multiple interacting subsystems. In the context of the autonomous chemical threat localization system 10, the simulator 135 plays an important role in creating a realistic virtual and simulated environment 130a for training the machine learning models and decision-making algorithms. By accurately modeling the gas diffusion and flow 145, as well as the behavior of the robotic platform 15 and the plurality of sensors 20x, the simulator 135 enables the system 10 to learn and optimize its strategies in a safe and controlled setting before deployment in real-world scenarios.

According to some examples, the simulator 135 leverages state-of-the-art physics engines and advanced computational fluid dynamics (CFD) models to accurately simulate the complex processes of gas diffusion and flow within the virtual environment 130a. The CFD models can take into account a wide range of factors that influence gas propagation, such as wind patterns, temperature gradients, pressure variations, and the presence of obstructions. By incorporating these factors, the simulator 135 can generate highly realistic gas dispersion scenarios that closely mimic the behavior of gases in the real world.

In an example, one aspect of the simulator 135 is its ability to generate observable data 140 that closely resembles the actual sensory data 25 that the robotic platform 15 would encounter in the real environment 30. The observable data 140 includes simulated visual data, non-visual data, and gas concentration measurements, all of which are synthesized to match the characteristics and quality of the real sensor data 25, according to some examples. During the simulated training process, the simulator 135 creates a virtual robotic platform that mimics the behavior and capabilities of the physical robotic platform 15, in an example. This virtual platform interacts with the simulated environment 130*a*, navigating through the virtual space and collecting simulated sensor data 150 using its virtual sensor suite, according to an example. The simulated sensor data 150 encompasses visual data, non-visual data, and gas concentration readings, providing a comprehensive representation of the virtual environment's conditions, in various examples.

According to an example, the processor 50 receives the observable data 140 generated by the simulator 135 and processes it through its machine learning models, including the module 35. By training on this simulated data, the processor 50 learns to effectively interpret and fuse the multi-modal information, enabling it to make informed decisions and take optimal actions within the simulated environment 130*a* to efficiently localize the virtual gas emission sources, in an example. The training process in the simulated environment 130*a* may employ advanced reinforcement learning algorithms, such as Deep Q-Networks (DQN), Proximal Policy Optimization (PPO), or Actor-Critic methods, for example. In an example, these algorithms allow the processor 50 to learn through trial and error, receiving rewards or penalties based on the effectiveness of its chosen actions in the simulated environment 130*a*. The reinforcement learning algorithm may continuously adjust the parameters of the processor's decision-making models to maximize the cumulative reward over time, gradually optimizing its strategy for gas source localization.

According to an example, the simulated training provides a safe and controlled setting for the processor 50 to learn and refine its decision-making capabilities without the risks and costs associated with real-world training. The simulator 135 can generate a wide range of scenarios, gas dispersion patterns, and environmental conditions, exposing the processor 50 to diverse situations and enabling it to develop robust and adaptable strategies.

In addition to the simulated training, the processor 50 can also be fine-tuned using reinforcement learning in a real environment 130*b* which may be the same or different environment as environment 30. During this phase, the physical robotic platform 15 may be deployed in a controlled real-world setting, and the processor 50 receives actual sensor data 25 from the plurality of sensors 20*x*. In an example, the processor 50 applies the strategies learned from the simulated training to make decisions and take actions in the real environment 130*b*. The real-world reinforcement learning may allow the processor 50 to adapt and optimize its decision-making models based on the unique challenges and intricacies of the physical environment 30. By interacting with the real environment 130*b* and receiving feedback on the outcomes of its actions, the processor 50 can fine-tune its models and improve its localization performance in real-world scenarios.

Through the combination of simulated training using the simulator 135 and real-world fine-tuning, the processor 50 can develop a highly sophisticated and robust decision-making capability for autonomous gas source localization. In some examples, the machine learning process 130, encompassing both simulated and real environments (130*a* and 130*b*), enables the processor 50 to effectively interpret multi-modal sensory data, navigate complex environments, and make intelligent decisions to locate chemical threats or emission sources with unprecedented efficiency and accuracy.

In an illustrative example of the simulated training process, the simulator 135 plays a crucial role in creating a realistic and dynamic virtual environment 130*a* that closely mimics the real-world conditions in which the robotic platform 15 will operate. In an example, the simulator 135 simulates a diffusion and flow of gas 145 through the simulated environment 130*a*, taking into account various environmental factors and physical laws governing gas dispersion, and the simulator 135 mimics the robotic platform 15 to interact with the simulated environment 130*a* to collect simulated sensor data 150.

For example, to simulate the gas diffusion and flow 145, the simulator 135 utilizes sophisticated computational fluid dynamics (CFD) models. In an example, these CFD models are based on the fundamental principles of fluid mechanics, such as the Navier-Stokes equations, which describe the motion of fluids and gases. According to an example, the simulator 135 discretizes the simulated environment 130*a* into a grid or mesh and applies the CFD equations to each cell or node of the grid to compute the gas concentration, velocity, and pressure at each point in space and time. The CFD models can incorporate various environmental parameters that influence gas dispersion, such as wind speed and direction, temperature gradients, pressure variations, and the presence of obstacles or boundaries. In an example, the simulator 135 takes into account the complex interactions between the gas and the environment, including the effects of turbulence, diffusion, and advection. For example, by solving the CFD equations numerically, the simulator 135 can predict the spatial and temporal evolution of the gas concentration and flow patterns within the simulated environment 130*a*.

To enhance the realism of the gas diffusion and flow simulation 145, the simulator 135 may employ advanced techniques such as Large Eddy Simulation (LES) or Direct Numerical Simulation (DNS). These techniques can capture the fine-scale turbulent motions and eddies that play a significant role in gas dispersion, especially in complex environments with obstacles and irregular geometries. By incorporating these high-fidelity simulation methods, the simulator 135 can generate highly accurate and detailed gas dispersion scenarios that closely resemble real-world conditions.

In addition to simulating the gas diffusion and flow 145, the simulator 135 can also mimic the behavior and interactions of the robotic platform 15 within the simulated environment 130*a*. In an example, the simulator 135 creates a virtual representation of the robotic platform 15, including its physical dimensions, the plurality of sensors 20*x*, and movement capabilities. The virtual robotic platform can navigate through the simulated environment 130*a*, responding to the simulated gas distribution and other environmental factors.

According to an example, as the virtual robotic platform moves through the simulated environment 130*a*, it collects simulated sensor data 150 using its virtual sensor suite. The simulator 135 generates synthetic sensor readings that mimic the data 25 that would be obtained by the real plurality of sensors 20*x* on the physical robotic platform 15.

This may include simulated visual data from cameras 20*a* and 20*b*, simulated point cloud data from LIDAR sensors 20*c*, simulated gas concentration measurements from gas sensors 20*e*, and simulated readings from other sensors such as RADAR sensor 20*d*, airflow sensors 20*f*, GPS sensor 20*g*, and SONAR sensor 20*h*.

In an example, the simulated sensor data 150 is generated based on the virtual robotic platform's position and orientation within the simulated environment 130*a*, as well as the simulated gas concentration and flow patterns at each location. According to an example, the simulator 135 applies sensor models that account for the characteristics and limitations of each sensor type, such as noise, resolution, and detection range. By incorporating realistic sensor models, the simulated sensor data 150 may closely resemble the actual data that would be obtained by the physical sensors in real-world conditions.

The virtual robotic platform's interaction with the simulated environment 130*a* may be governed by the same control algorithms and decision-making models that will be used by the physical robotic platform 15 in the real-world environment 130*b*. In an example, the simulator 135 allows the virtual robotic platform to execute various actions, such as moving to different locations, adjusting its sensors, or activating any onboard actuators. These actions may be determined by the processor 50 based on the simulated sensor data 150 and the decision-making models being trained.

According to an example, as the virtual robotic platform collects simulated sensor data 150 and interacts with the simulated environment 130*a*, the processor 50 receives this data and uses it to train and refine its machine learning models. In an example, the processor 50 learns to interpret the simulated sensor data 150, fuse the information from different modalities, and make decisions to optimize its navigation and gas source localization strategies. The simulated training process allows the processor 50 to learn and adapt its models in a safe and controlled environment before deploying the physical robotic platform 15 in real-world scenarios, such as in environment 30, according to an example.

By leveraging the advanced gas diffusion and flow simulation capabilities of the simulator 135, along with the realistic modeling of the robotic platform 15 and its interactions with the simulated environment 130*a*, the system 10 can develop highly sophisticated and robust decision-making models, according to an example. The simulated training process enables the system to learn and optimize its strategies for gas source localization, ultimately enhancing its performance and reliability in real-world applications, according to an example.

Figure 7:
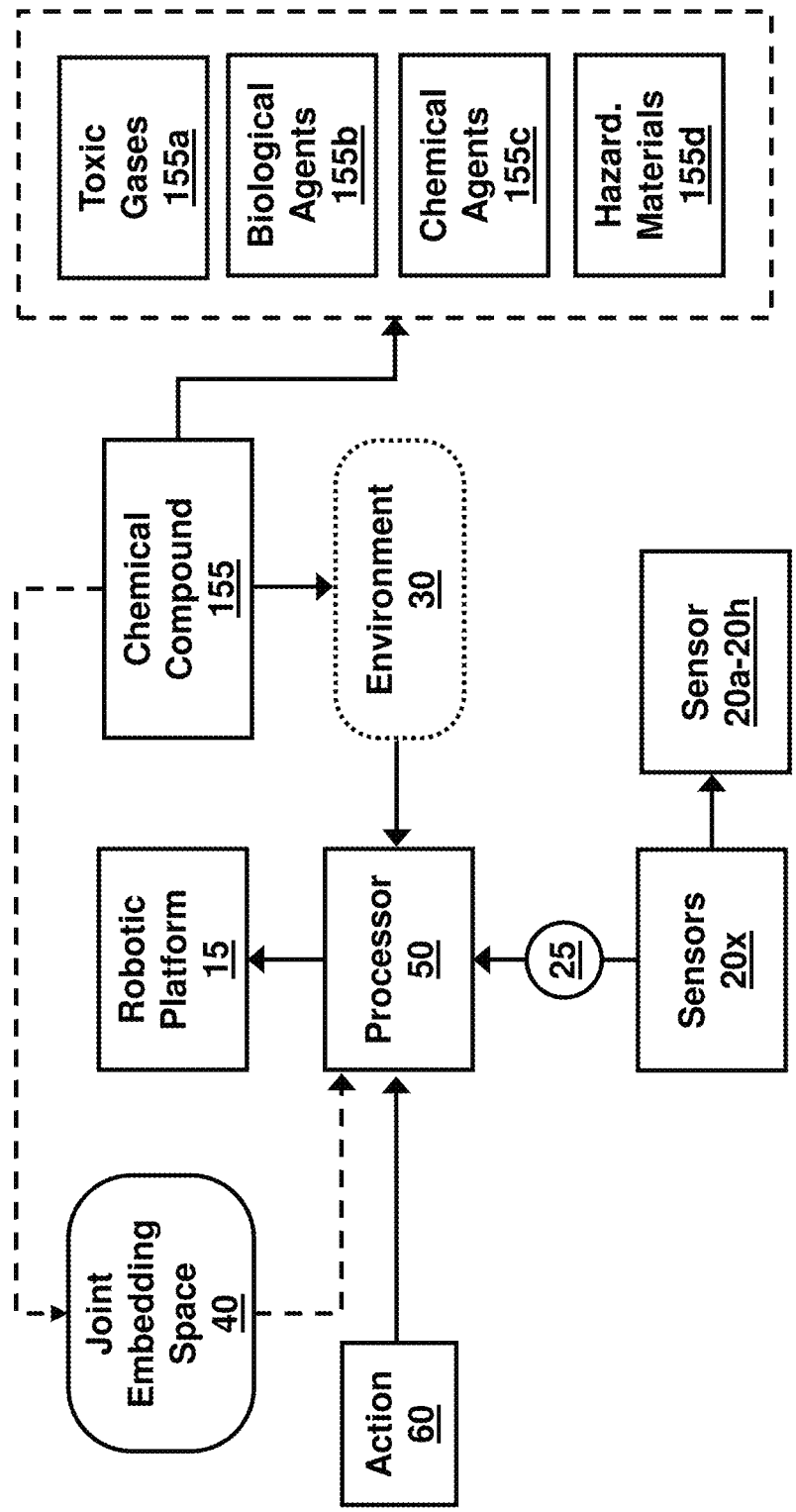
FIG. 7 is a block diagram illustrating aspects of the operational action selected by the processor of the autonomous source localization system of FIG. 1, according to an embodiment herein.

FIG. 7, with reference to FIGS. 1 through 6, illustrates that the operational action 60 selected by the processor 50 may comprise moving the robotic platform 15, rotating the robotic platform 15, collecting data 25 from a particular sensor 20*a*-20*h* of the plurality of sensors 20*x*, declaring a location of a source of gas in the environment 30, or a combination thereof. The operational action 60 selected by the processor 50 may represent the culmination of the autonomous decision-making process within the system 10. The processor 50, having been trained through extensive machine learning techniques 130 and simulated environments 130*a* as well as real environments 130*b*, may be capable of analyzing the multi-modal sensor data 25 collected by the robotic platform 15 and determining the most effective course of action to locate the source of the chemical threat.

In an example, one of the primary operational actions 60 that the processor 50 may select is moving the robotic platform 15 within the environment 30. The decision to move the platform 15 may be based on the analysis of the sensor data 25 by the processor 50, which provides information about the spatial distribution of gas concentrations, visual cues, and other relevant environmental factors. By incorporating the data 25 from the plurality of sensors 20*x*, the processor 50 can identify potential areas of interest or regions with higher likelihood of containing the gas source, for example. The processor 50 then calculates the optimal movement path for the robotic platform 15, considering factors such as obstacle avoidance, energy efficiency, and information gain, according to some examples. The selected movement action aims to position the platform 15 in locations that maximize the chances of detecting and localizing the gas source, etc. while minimizing the time and resources required for the search process, in an example.

Another operational action 60 that the processor 50 may choose is rotating the robotic platform 15. The rotation action may be particularly useful when the platform 15 is equipped with directional sensors, such as cameras 20*a*, 20*b*, or LIDAR sensor 20*c*, which may have limited fields of view. By rotating the platform 15, the processor 50 can gather sensor data 25 from different angles and perspectives, enabling a more comprehensive understanding of the environment 30. For example, the rotation action allows the platform 15 to scan its surroundings, detect obstacles, and identify potential gas emission sources that may not be visible from a single viewpoint. In an example, the processor 50 determines the optimal rotation angles and sequences based on the analysis of the sensor data 25 and the specific objectives of the localization task.

In addition to movement and rotation actions, the processor 50 may also select the operational action 60 of collecting data 25 from a particular sensor 20*a*-20*h* among the plurality of sensors 20*x* onboard the robotic platform 15. This action may involve prioritizing the acquisition of data from specific sensors that are deemed most informative for the current state of the localization process. For example, if the gas concentration levels are low and the visual data indicates the presence of potential emission sources, the processor 50 may choose to collect high-resolution data from the RGB camera 20*a* or the RGBD camera 20*b* to gather more detailed visual information. Conversely, if the gas concentrations are high and the source is likely to be nearby, the processor 50 may prioritize the collection of data from the gas concentration sensor 20*e* or the airflow sensor 20*f* to refine the estimates of the gas distribution and flow patterns. In an example, the selective data collection action allows the system to optimize the utilization of sensor resources and focus on the most relevant data streams for efficient threat localization.

Furthermore, the processor 50 may select the operational action 60 of declaring the location of the gas source within the environment 30. This action represents the decision made by the system 10 when it has accumulated sufficient evidence to confidently identify the position of the chemical threat, in an example. The declaration of the source location may be based on the fusion of multi-modal sensor data 25 and the application of sophisticated probabilistic algorithms. The processor 50 may analyze the spatial and temporal patterns of gas concentrations, visual features, and other environmental cues to estimate the most likely location of the emission source. The declaration action 60 may involve communicating the determined source coordinates to human operators or triggering additional actions, such as activating containment measures or alerting relevant authorities. Moreover, the declaration action 60 may involve automatically maneuvering the robotic platform 15 in accordance with real-time guidance in conjunction with data 25 provided by the GPS sensor 20g or a preprogrammed set of guidance instructions executed by the processor 50.

The operational action 60 selected by the processor 50 can be a combination of multiple actions, depending on the complexity of the environment 30 and the specific requirements of the localization task. For instance, the processor 50 may choose to move the robotic platform 15 to a new location, rotate it to acquire data from a different perspective, and then collect focused data from a specific sensor 20a-20h, all within a single decision cycle. The combination of actions may allow the system 10 to adapt its behavior dynamically based on the evolving state of knowledge and the changing conditions of the environment 30.

According to an example, the selection of the appropriate operational action 60 by the processor 50 is a unique aspect of the system 10. By leveraging advanced machine learning algorithms and the fusion of multi-modal sensor data 25, the processor 50 can make intelligent and optimized decisions to guide the robotic platform 15 towards the successful localization of the gas emission source. In an example, the ability to autonomously select and execute these actions 60 significantly enhances the efficiency, accuracy, and reliability of the threat localization process, ultimately improving the overall performance of the system in real-world scenarios.

In other examples, the processor 50 may identify a chemical compound 155 in the environment 30 being sensed based on the integrated joint embedding space 40, and the chemical compound 155 may comprise toxic gases 155a, biological agents 155b, chemical agents 155c, hazardous materials 155d, or a combination therein. In this regard, the identification of the specific chemical compound 155 present in the environment 30 is a unique aspect of the system 10, according to an example. The processor 50, through its advanced machine learning algorithms and the utilization of the integrated joint embedding space 40, possesses the capability to detect and classify the type of chemical substance posing a potential threat, according to an example. This identification process is made possible by the fusion of multi-modal sensor data 25 collected by the plurality of sensors 20x and the subsequent mapping of this data 25 into the joint embedding space 40 by the module 35, for example.

The joint embedding space 40 serves as a unified representation of the heterogeneous sensor data 25, where the high-dimensional features extracted from the visual, non-visual, and gas concentration sensors 20x are projected into a common latent space, according to an example. Within this embedding space 40, the processor 50 may employ sophisticated pattern recognition and classification techniques to identify the specific chemical compound 155 based on its unique signature across multiple sensing modalities. By leveraging the complementary information provided by the plurality of sensors 20x and the learned associations within the joint embedding 40, the processor 50 can accurately discriminate between different types of chemical substances and determine the nature of the threat.

One class of chemical compounds 155 that the processor 50 may identify is toxic gases 155a. For example, toxic gases 155a, such as carbon monoxide, hydrogen sulfide, or ammonia, pose significant risks to human health and the environment. The identification of toxic gases 155a may involve analyzing the gas concentration data 25 obtained from the gas sensor 20e, along with relevant contextual information from the visual and non-visual sensors 20a-20d, 20f-20h. The processor 50 may compare the detected gas concentrations and their spatial distribution patterns against known profiles of toxic gases stored in its knowledge base. By considering factors such as the gas concentration levels, the environmental conditions, and the presence of potential emission sources, the processor 50 can accurately classify the detected gas as a specific toxic substance 155a.

Another category of chemical compounds 155 that the processor 50 may identify is biological agents 155b. For example, biological agents 155b, including bacteria, viruses, or toxins, can pose severe threats to public health and safety. The identification of biological agents 155b may include the integration of data from specialized biological sensors, such as surface plasmon resonance (SPR) or polymerase chain reaction (PCR) devices, into the multi-modal sensing framework of the system 10. These biological sensors may provide specific molecular information that can be mapped into the joint embedding space 40 alongside the data from the other sensors 20x. By analyzing the unique biological signatures and their associations with the environmental context, the processor 50 can identify the presence of specific biological agents 155b and assess the potential biohazard risks.

The processor 50 may also identify chemical agents 155c within the environment 30. For example, chemical agents 155c, such as nerve agents or blister agents, are highly toxic substances that can cause severe harm to living organisms. The identification of chemical agents 155c may involve the detection of specific chemical compounds or their precursors using advanced chemical sensors, such as ion mobility spectrometers (IMS) or Raman spectrometers. These sensors may provide detailed information about the molecular composition and structure of the detected substances. By mapping this chemical data into the joint embedding space 40 and analyzing it in conjunction with the visual and non-visual cues, the processor 50 can identify the presence of known chemical agents 155c and trigger appropriate alert mechanisms.

Furthermore, the processor 50 may identify hazardous materials 155d in the environment 30. For example, hazardous materials 155d include substances that pose risks to human health, property, or the environment, such as flammable liquids, corrosive substances, or radioactive materials. The identification of hazardous materials 155d may involve the integration of data from specialized sensors, such as radiation detectors or pH sensors, into the multi-modal sensing framework. By analyzing the sensor readings in the context of the joint embedding space 40 and considering factors such as the physical properties, chemical reactivity, and environmental interactions of the detected substances, the processor 50 can accurately classify the hazardous materials 155d present in the environment 30.

The chemical compound 155 identified by the processor 50 may comprise a combination of multiple types of substances, such as a mixture of toxic gases 155a and chemical agents 155c, for example. The processor 50, through its advanced machine learning algorithms and the utilization of the joint embedding space 40, can detect and classify multiple chemical threats simultaneously. By considering the complex interactions and synergistic effects of different substances, the processor 50 can provide a comprehensive assessment of the chemical hazards present in the environment 30. Furthermore, the identification of the specific chemical compound 155 by the processor 50 is a unique step in the autonomous chemical threat localization process, according to an example. By accurately classifying the type of chemical substance and its associated risks, the system 10 can provide valuable information to guide the appropriate response actions, such as evacuation, containment, or decontamination measures. The ability to identify a wide range of chemical compounds 155, including toxic gases 155a, biological agents 155b, chemical agents 155c, and hazardous materials 155d, demonstrates the versatility and robustness of the autonomous system 10 in detecting and mitigating diverse chemical threats in complex real-world environments 30.

FIG. 8A, with reference to FIGS. 1 through 7, is a flow diagram illustrating a method 200 of performing autonomous source localization in an environment 30 being sensed, according to an embodiment herein. The method 200 comprises collecting (201) visual, non-visual, and gas concentration data 25 of the environment 30 being sensed by a plurality of sensors 20x on a robotic platform 15; integrating (203) the visual, non-visual, and gas concentration data 25 into a joint embedding space 40 using a neural network architecture 45; receiving (205) a history of system states and actions 55 of the robotic platform 15, wherein the history of system states and actions 55 comprises a location and orientation of the robotic platform 15 and previous actions taken by the robotic platform 15; selecting (207) an operational action 60 for the robotic platform 15 based on the joint embedding space 40, the history of system states and actions 55, and neural network inputs 65; and causing (209) the robotic platform 15 to perform a selected operational action 60.

In an example the method 200 leverages the capabilities of the autonomous chemical threat localization system 10 to efficiently and accurately detect and locate the source of a chemical emission or threat within the environment 30. According to an example, the method 200 begins with the step of collecting (201) visual, non-visual, and gas concentration data 25 of the environment 30 using a plurality of sensors 20x mounted on the robotic platform 15. The robotic platform 15 may serve as a mobile sensing unit that can navigate through the environment 30 and gather comprehensive data 25 about its surroundings. The plurality of sensors 20x comprises a diverse array of sensing modalities, including visual sensors such as RGB cameras 20a, RGBD camera 20b, and LIDAR sensor 20c, as well as non-visual sensors such as RADAR sensor 20d, gas concentration sensor 20e, airflow sensor 20f, GPS sensor 20g, and SONAR sensor 20h, according to various examples. These sensors 20x collect rich, varied, and complementary data streams 25 that capture different aspects of the environment 30, including visual imagery, 3D spatial information, gas concentrations, wind patterns, and location data 25, for example.

The collected visual, non-visual, and gas concentration data 25 is then integrated (203) into a joint embedding space 40 using a neural network architecture 45, according to an example. The neural network architecture 45 may serve as a multi-modal data fusion mechanism that learns to map the heterogeneous sensor data 25 into a unified representation. In an example, the joint embedding space 40 captures the salient features and relationships among the different sensing modalities, enabling the system 10 to reason about the environment 30 holistically. The neural network architecture 45 can take various forms, such as an encoder-decoder architecture 75, convolutional neural network (CNN) for processing visual data, a recurrent neural network (RNN) for handling sequential non-visual data, or a transformer architecture 100 for modeling the interactions between different modalities. By integrating the multi-modal data 25 into the joint embedding space 40, the system 10 can effectively leverage the complementary information provided by each sensor 20x to enhance the localization accuracy and robustness.

In addition to the integrated sensor data, the method 200 involves receiving (205) a history of system states and actions 55 of the robotic platform 15, according to an example. The history of system states and actions 55 encapsulates the past behavior and experiences of the robotic platform 15 as it navigates through the environment 30, for example. This history may include information such as the location and orientation of the platform 15 at different time steps, as well as the previous actions taken by the platform 15, such as movements, rotations, and sensor data collection. The inclusion of the history of system states and actions 55 can enable the autonomous system 10 to consider the temporal context and make informed decisions in real-time based on its past experiences. By incorporating this historical information, the system 10 can learn from its previous successes and failures, adapt its strategies dynamically, and avoid repeating suboptimal actions.

Based on the integrated joint embedding space 40, the history of system states and actions 55, and additional neural network inputs 65, the method 200 proceeds to select (207) an operational action 60 for the robotic platform 15, according to an example. The selection of the operational action 60 is performed by a decision-making module, such as a reinforcement learning agent or a model-based planner, which takes into account the current state of the system 10 and the learned representations from the joint embedding space 40, in some examples. The neural network inputs 65 can include additional contextual information, such as mission objectives, user preferences, or prior knowledge about the environment 30, which can influence the selection of the operational action 60. The operational action 60 can encompass various behaviors of the robotic platform 15, such as moving to a new location, rotating to gather data from a different viewpoint, collecting data from a specific sensor 20a-20h, or declaring the location of the gas source based on the accumulated evidence.

Once the operational action 60 is selected, the method 200 involves causing (209) the robotic platform 15 to perform the selected action, according to an example. This step translates the high-level decision made by the system 10 into concrete commands that control the actuators and sensors of the robotic platform 15, according to an example. The execution of the operational action 60 can involve sending control signals to the motors and steering mechanisms of the platform 15 to initiate movement, adjusting the orientation of the sensors 20x to capture data from the desired perspective, or activating specific sensors 20x to gather targeted measurements. In an example, the robotic platform 15 then carries out the selected action, interacting with the environment 30 and collecting new data 25 in the process.

The method 200 may operate in an iterative manner, according to an example, where the steps of collecting (201) data, integrating (203) the data into the joint embedding space 40, receiving (205) the history of system states and actions 55, selecting (207) an operational action 60, and causing (209) the robotic platform 15 to perform the action are repeated continuously until the target source, etc. is successfully localized or a termination criterion is met. For example, at each iteration, the system 10 updates its understanding of the environment 30 based on the newly collected data 25 and the feedback received from the execution of the previous action. This iterative process can allow the system 10 to refine its decision-making and adapt its strategies as it gathers more information about the environment 30 and the location of the target source.

According to an example, the autonomous source localization method 200 provides a robust and efficient approach to detect and locate chemical threats or emissions in complex environments 30. By leveraging the multi-modal sensing capabilities of the robotic platform 15, the data fusion power of the joint embedding space 40, and the decision-making intelligence of the neural network architecture 45, the method 200 may enable the system 10 to navigate the environment 30 autonomously, collect informative data 25, and make optimal decisions to localize the target source. The integration of historical information and the iterative nature of the method 200 may allow the system 10 to learn and adapt dynamically, improving its performance over time. Overall, the method 200 represents a significant advancement in the field of autonomous chemical threat localization, providing a reliable and effective solution for safeguarding public safety and mitigating the risks posed by hazardous substances, in an example.

The neural network inputs 65 may provide extracted visual features 90 from visual sensory data 95 received by the plurality of sensors 20x. The neural network inputs 65 may fuse the visual features 90 with non-visual data 25x received by the plurality of sensors 20x and extract cross-modal information 92. The neural network inputs 65 may map the fused information 94 onto the joint embedding space 40.

The process of providing neural network inputs 65, fusing visual features 90 with non-visual data 25x, extracting cross-modal information 92, and mapping the fused information 94 onto the joint embedding space 40 can occur iteratively within the system 10, according to an example. An iterative process can allow the system 10 to continuously update its understanding of the environment 30 and refine its decision-making as new sensor data 25 becomes available.

At each iteration, the neural network inputs 65 may receive and process the latest visual sensory data 95 captured by the visual sensors (e.g., such as cameras 20a, 20b and LIDAR sensor 20c) on the robotic platform 15. The neural network inputs 65 may apply computer vision techniques, such as convolutional neural networks (CNNs), to extract meaningful visual features 90 from the raw visual sensory data 95. According to some examples, these visual features 90 capture salient patterns, edges, textures, and objects within the visual data, providing a compact and informative representation of the visual content. Concurrently, the neural network inputs 65 may also receive and process the latest non-visual data 25x acquired by the non-visual sensors (e.g., such as sensors 20e-20h) on the robotic platform 15. The neural network inputs 65 may extract relevant features and patterns from the non-visual data 25x, capturing the essential characteristics and dynamics of the non-visual aspects of the environment 30.

In an example, the neural network inputs 65 then fuse the extracted visual features 90 with the non-visual data 25x to create a multi-modal representation of the environment 30. This fusion process may involve combining and integrating the information from both the visual and non-visual modalities, allowing the system 10 to leverage the complementary nature of the different sensor types. The fusion can be achieved through various techniques, such as concatenation, element-wise addition, or attention mechanisms, depending on the specific neural network architecture 45 employed.

During the fusion process, the neural network inputs 65 may extract cross-modal information 92 by learning the relationships and correlations between the visual features 90 and the non-visual data 25x. This cross-modal information 92 may capture the synergistic effects and dependencies between the different sensing modalities, enabling the system 10 to reason about the environment 30 in a more comprehensive and contextual manner. For example, the cross-modal information 92 may reveal how the gas concentration levels correlate with certain visual cues, such as the presence of potential emission sources or the movement of gas plumes.

Thereafter, the neural network inputs 65 can map the fused information 94, which includes the visual features 90, non-visual data 25x, and the extracted cross-modal information 92, onto the joint embedding space 40. For example, the joint embedding space 40 serves as a unified representation that encodes the multi-modal information in a compact and meaningful way. The mapping process may involve projecting the fused information 94 into a lower-dimensional space where similar environmental states are clustered together, and dissimilar states are separated. According to an example, the joint embedding space 40 enables efficient similarity comparisons, pattern recognition, and decision-making based on the multi-modal data.

The iterative process of providing neural network inputs 65, fusing visual features 90 with non-visual data 25x, extracting cross-modal information 92, and mapping the fused information 94 onto the joint embedding space 40 allows the system 10 to continuously update its perception and understanding of the environment 30, according to an example. As new sensor data 25 is collected at each iteration, the system 10 may refine its visual and non-visual feature representations, captures evolving cross-modal relationships, and adapts the joint embedding space 40 to reflect the latest state of the environment 30. Moreover, this iterative process can enable the system 10 to make informed decisions and take appropriate actions based on the most up-to-date and comprehensive understanding of the environment 30. By continuously fusing and integrating multi-modal information, the system 10 can detect and respond to changes in the environment 30, adapt to new situations, and improve its localization accuracy over time. For example, the iterative nature of this process allows the autonomous chemical threat localization system 10 to operate effectively in dynamic and complex environments, enhancing its ability to detect, locate, and mitigate biological, chemical, hazardous, and other threats.

FIG. 8B, with reference to FIGS. 1 through 8A, is a flow diagram illustrating that the method 200 may comprise creating (211) a simulated environment 130a of the environment 30 being sensed; generating (213) observable data 140 from the simulated environment 130a; simulating (215) a diffusion and flow of gas 145 through the simulated environment 130a; and mimicking (217) the robotic platform 15 to interact with the simulated environment 130a to collect simulated sensor data 150. The selected operational action 60 may comprise moving the robotic platform 15, rotating the robotic platform 15, collecting data from a particular sensor of the plurality of sensors 20x, declaring a location of a source of gas in the environment 30, or a combination thereof.

For example, the simulation-based approach enables the system 10 to learn and adapt its behavior in a safe and controlled setting before being deployed in the real environment 30. The method 200 shown in FIG. 8B may be an iterative process according to an example. The method 200 may comprise creating (211) a simulated environment 130a that closely mimics the characteristics and dynamics of the real environment 30 being sensed. The simulated environment 130a may be designed to replicate the physical layout, obstacles, atmospheric conditions, and other relevant factors that influence the dispersion and detection of chemical threats. For example, the creation of the simulated environment 130a involves modeling the geometry, dimensions, and material properties of the space, as well as the initial conditions and boundary constraints. Advanced simulation techniques, such as 3D modeling, physics engines, and computational fluid dynamics (CFD), may be employed to ensure the fidelity and accuracy of the simulated environment 130a.

Once the simulated environment 130a is created, the method 200 proceeds to generate (213) observable data 140 from the simulated environment 130a, according to an example. The observable data 140 may represent the virtual sensor readings and measurements that the robotic platform 15 would collect if it were operating in the real environment 30. The generation of observable data 140 may involve simulating the behavior and response of the plurality of sensors 20x on the robotic platform 15. The observable data 140 is generated based on the simulated environment's state, including the presence and distribution of chemical agents, the lighting conditions, and the relative positions of objects and obstacles, for example.

To enhance the realism and accuracy of the simulation, the method 200 may include simulating (215) the diffusion and flow of gas 145 through the simulated environment 130a. For example, this step involves modeling the physical behavior and dynamics of the chemical compounds as they propagate and disperse within the simulated space. Advanced numerical methods, such as finite element analysis (FEA) or computational fluid dynamics (CFD), may be employed to solve the governing equations of gas diffusion and flow, taking into account factors such as wind patterns, temperature gradients, and the presence of obstacles. According to an example, the simulation of gas diffusion and flow 145 enables the system 10 to generate realistic gas concentration distributions and plume shapes within the simulated environment 130a, closely mimicking the behavior of chemical threats in the real environment 30, 130b.

To facilitate the learning and adaptation of the autonomous system 10, the method 200 may include mimicking (217) the robotic platform 15 to interact with the simulated environment 130a and collect simulated sensor data 150. According to an example, this step involves creating a virtual representation of the robotic platform 15 within the simulated environment 130a, complete with the plurality of sensors 20x and actuators (not shown). In an example, the virtual robotic platform 15 is controlled by the same algorithms and decision-making modules that govern the real robotic platform 15, allowing it to navigate, explore, and collect data within the simulated environment 130a. The simulated sensor data 150 collected by the virtual robotic platform 15 closely resembles the data that would be acquired by the real plurality of sensors 20x in the real environment 30, enabling the system 10 to train and optimize its performance based on realistic data 25, according to an example.

During the simulation process, the method 200 may involve selecting (207) an operational action 60 for the virtual robotic platform 15 based on the joint embedding space 40, the history of system states and actions 55, and the neural network inputs 65, as described in the previous paragraphs. The selected operational action 60 may comprise various behaviors and decisions, such as moving the robotic platform 15 to a new location, rotating the robotic platform 15 to capture data from a different perspective, collecting data from a particular sensor of the plurality of sensors 20x, or declaring the location of a source of gas in the simulated environment 130a. In an example, these operational actions 60 are executed within the simulated environment 130a, and their outcomes are observed and evaluated to update the system's understanding and decision-making capabilities.

The simulation-based approach described in this embodiment of the method 200 offers several unique aspects for the system 10, according to some examples. By training and testing the system 10 in a simulated environment 130a, researchers and engineers can expose the system 10 to a wide range of scenarios, gas concentrations, and environmental conditions without the risks and costs associated with real-world experiments. Moreover, in an example, the simulated environment 130a allows for rapid iteration, experimentation, and fine-tuning of the system's algorithms, models, and parameters, enabling the development of robust and reliable threat localization strategies.

Furthermore, the simulation-based approach enables the system 10 to learn and adapt its behavior in a safe and controlled manner before being deployed in the real environment 30, according to an example. By interacting with the simulated environment 130a and collecting simulated sensor data 150, the system 10 can refine its perception, decision-making, and control algorithms, improving its ability to detect, locate, and mitigate chemical threats effectively. The knowledge and experience gained from the simulated training can be transferred to the real robotic platform 15, allowing it to operate with increased efficiency, accuracy, and robustness in the real environment 30.

Overall, the incorporation of a simulated environment 130a and the associated simulation steps in the method 200 enhances the development, training, and optimization of the system 10, according to an example. By leveraging advanced simulation techniques and realistic modeling of gas diffusion and flow, the method 200 may enable the system 10 to learn and adapt its behavior in a safe, efficient, and cost-effective manner, ultimately improving its performance and reliability in real-world deployments.

Figure 9A:
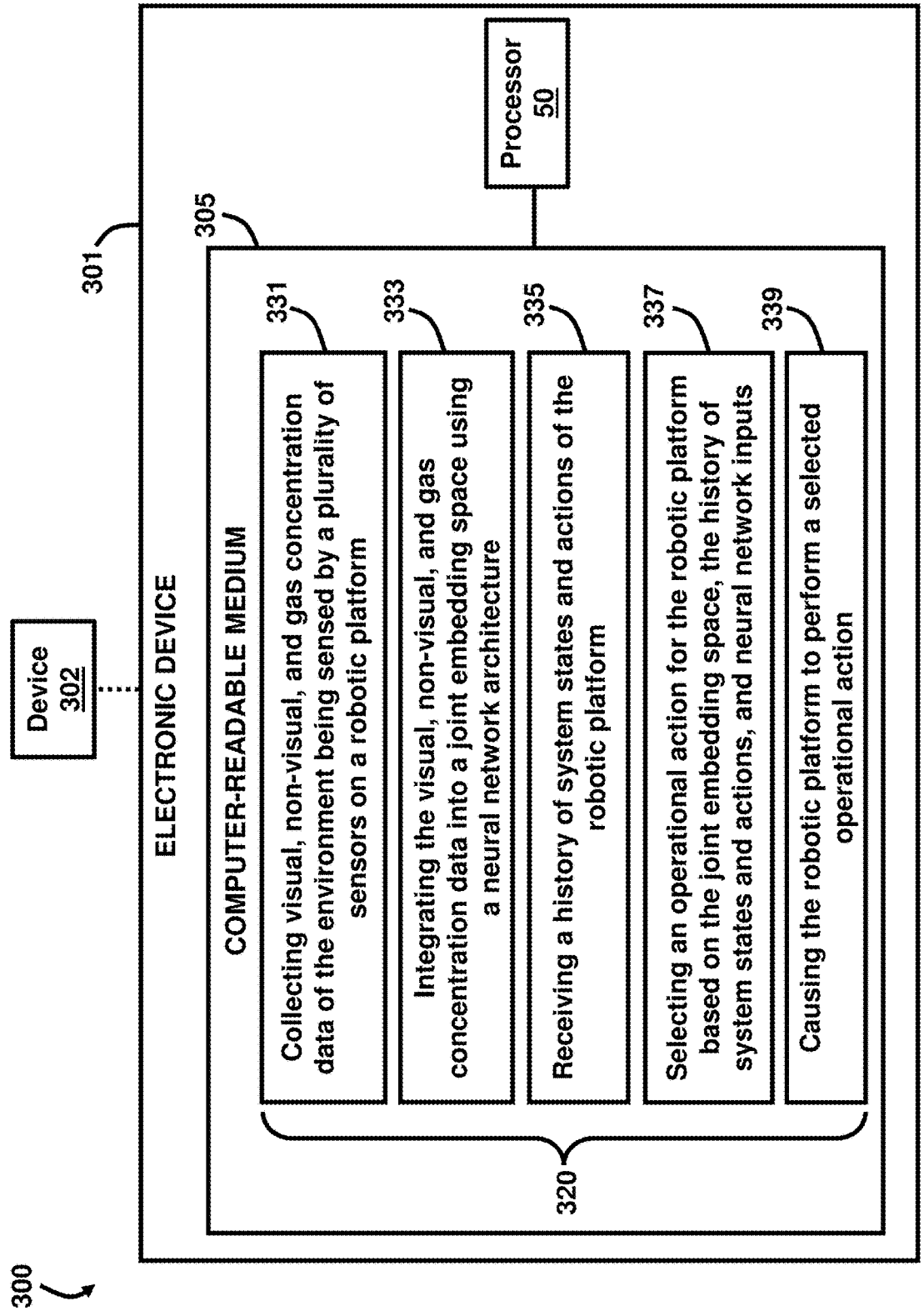
FIG. 9A is a block diagram illustrating a system executing computer-executable instructions, according to an embodiment herein.
Figure 9B:
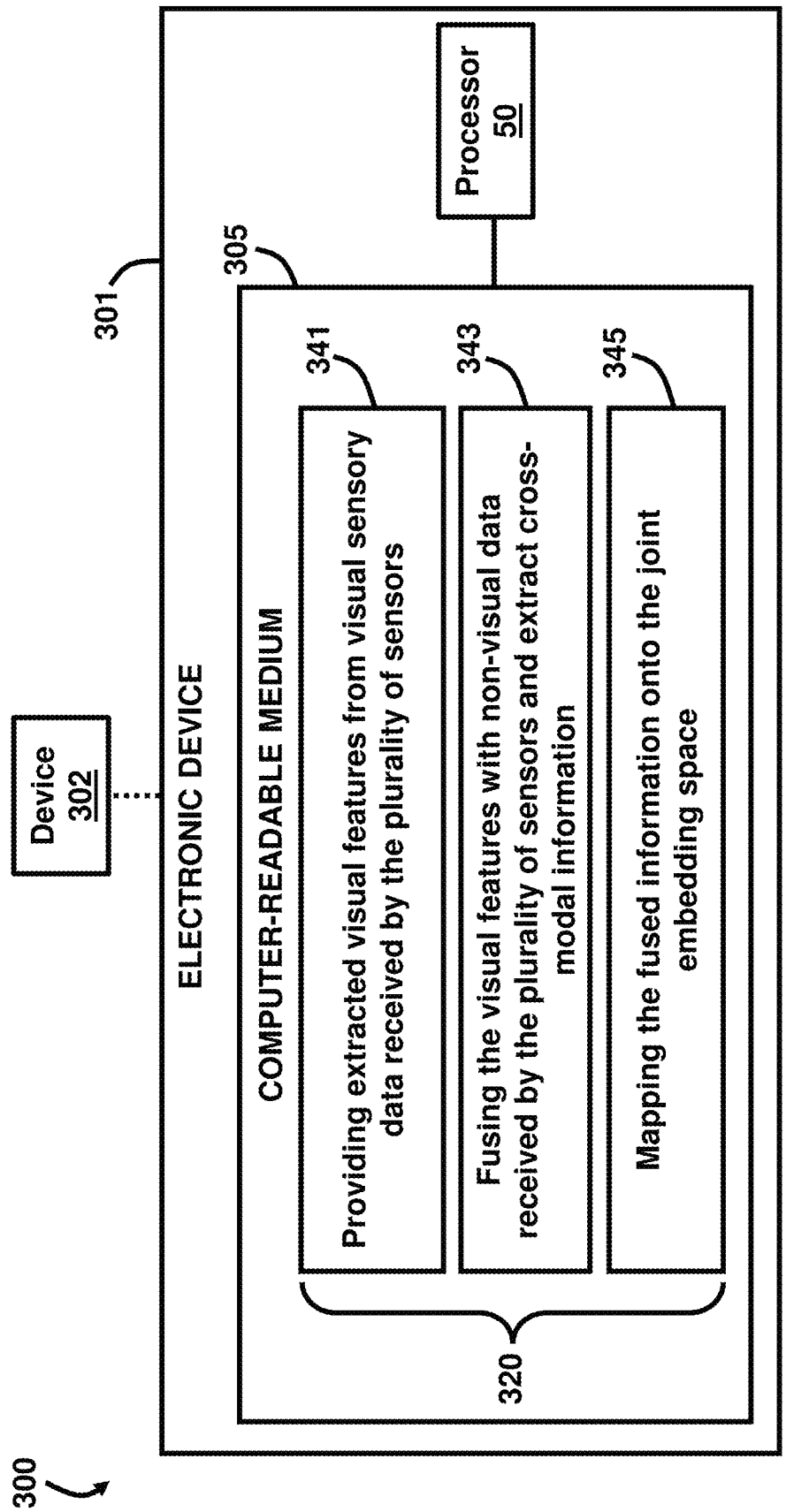
FIG. 9B is a block diagram illustrating a system executing further computer-executable instructions, according to an embodiment herein.
Figure 9C:
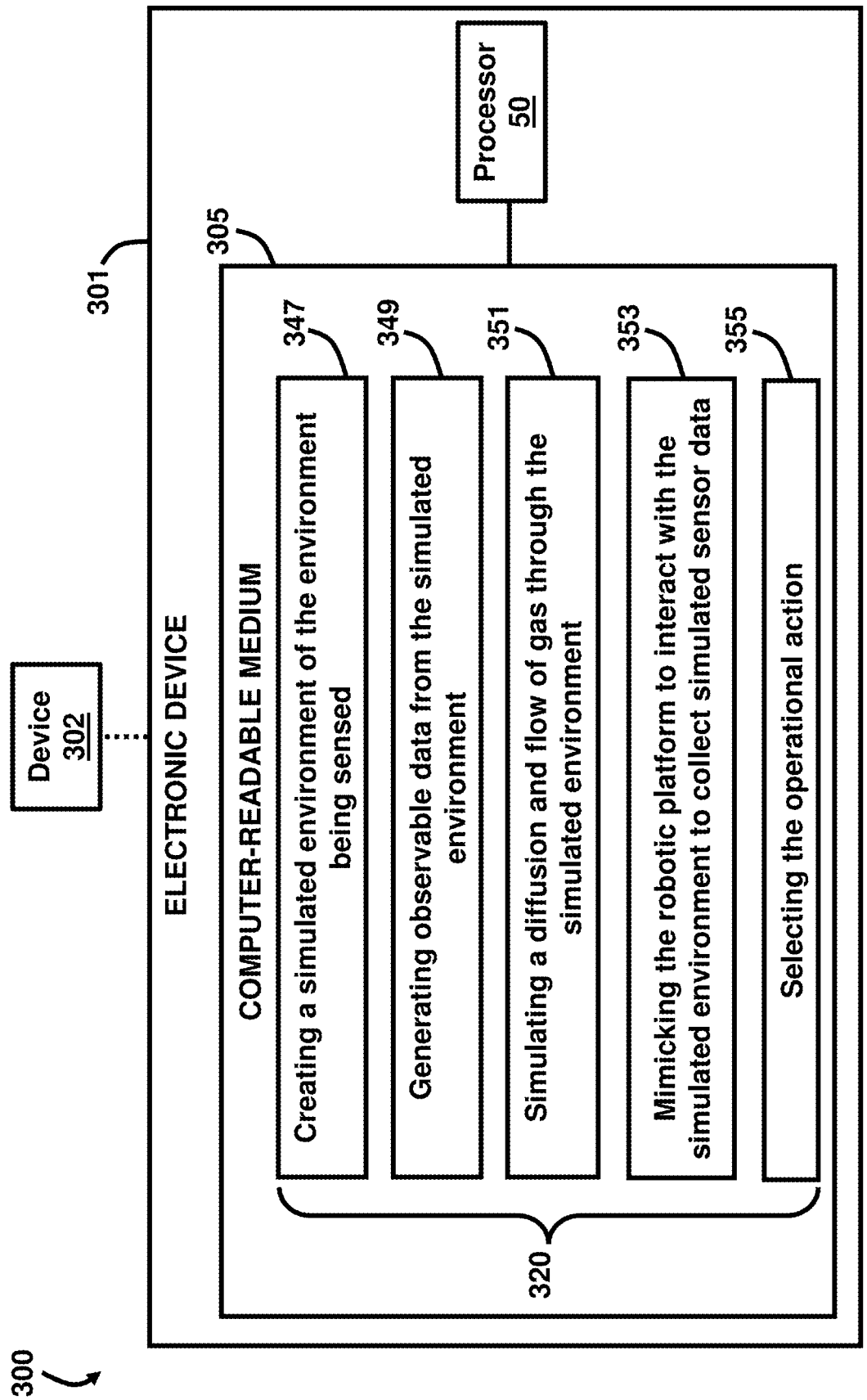
FIG. 9C is a block diagram illustrating a system executing still further computer-executable instructions, according to an embodiment herein.

FIGS. 9A through 9C, with reference to FIGS. 1 through 8B, illustrates another example of a system 300 for performing autonomous source localization in an environment 30 being sensed. According to an example, the system 300 comprises an electronic device 301 containing a computer-readable storage medium 305, and a remote communication device 302 communicatively linked to the electronic device 301. In the example of FIGS. 9A through 9C, the electronic device 301 includes the processor 50 and the computer-readable storage medium 305. Processor 50 may include a central processing unit, microprocessors, hardware engines, and/or other hardware devices suitable for retrieval and execution of instructions stored in a computer-readable storage medium 305, for example. Processor 50 may fetch, decode, and execute computer-executable instructions 320 to enable execution of locally-hosted or remotely-hosted applications for controlling action of the electronic device 301. The remotely-hosted applications may be accessible on remotely-located devices; for example, the remote communication device 302. For example, the remote communication device 302 may be a laptop computer, tablet device, smartphone, or notebook computer. As an alternative or in addition to retrieving and executing instructions, processor 50 may include electronic circuits including a number of electronic components for performing the functionality of the computer-executable instructions 320.

The computer-readable storage medium 305 may be any electronic, magnetic, optical, or other physical storage device that stores executable instructions. Thus, the computer-readable storage medium 305 may be, for example, Random Access Memory, an Electrically-Erasable Programmable Read-Only Memory, volatile memory, non-volatile memory, flash memory, a storage drive (e.g., a hard drive), a solid-state drive, optical drive, any type of storage disc (e.g., a compact disc, a DVD, etc.), and the like, or a combination thereof. In one example, the computer-readable storage medium 305 may include a non-transitory computer-readable storage medium 305. The computer-readable storage medium 305 may be encoded with executable instructions for enabling execution of remotely-hosted applications accessed on the remote communication device 302. In an example, the processor 50 of the electronic device 301 executes the computer-executable instructions 320 that when executed cause the electronic device 301 to perform computer-executable instructions 331-355.

As shown in the example of FIG. 9A, the computer-readable medium 305 is configured for storing instructions 320 for collecting (331) visual, non-visual, and gas concentration data 25 of the environment 30 being sensed by a plurality of sensors 20x on a robotic platform 15; integrating (333) the visual, non-visual, and gas concentration data 25 into a joint embedding space 40 using a neural network architecture 45; receiving (335) a history of system states and actions 55 of the robotic platform 15, wherein the history of system states and actions 55 comprises a location and orientation of the robotic platform 15 and previous actions taken by the robotic platform 15; selecting (337) an operational action 60 for the robotic platform 15 based on the joint embedding space 40, the history of system states and actions 55, and neural network inputs 65; and causing (339) the robotic platform 15 to perform a selected operational action 60.

In an example, the system 300 fuses the data stream from multiple on-board sensors 20x to navigate the environment 30, localize the source, and detect the chemical dispersion source. According to an example, the multi-modal information sources help the system 300 avoid getting caught in local patches of the gas and to be able to pinpoint the threat using visual cues. The system 300 may create an accurate internal representation of the gas distribution using geometry of the space as provided by the plurality of sensors 20x. Moreover, the system 300 can take into account, the structure of the environment 30 and obstacles to locate the source of emission. In an example, the neural network architecture 45 integrates the information from the various sensing modalities provided by the plurality of sensors 20x. The module 35 may receive the fused information, as well as the previous system states 55, and selects the optimal action 60 given the constraints. The robotic interface 70 may perform the action and/or relay the information to a human operator, such as user 120.

In FIGS. 9B and 9C, the various blocks are not necessarily sequential and may be practiced independently from each other and/or in any suitable order. As shown in FIG. 9B, the instructions 320 may comprise providing (341) extracted visual features 90 from visual sensory data 95 received by the plurality of sensors 20x; fusing (343) the visual features 90 with non-visual data 25x received by the plurality of sensors 20x and extract cross-modal information 92; and mapping (345) the fused information 94 onto the joint embedding space 40.

As shown in FIG. 9C, the instructions 320 may comprise creating (347) a simulated environment 130a of the environment 30 being sensed; generating (349) observable data 140 from the simulated environment 130a; simulating (351) a diffusion and flow of gas 145 through the simulated environment 130a; and mimicking (353) the robotic platform 15 to interact with the simulated environment 130a to collect simulated sensor data 150. The instructions 320 may comprise selecting (355) the operational action 60 comprising moving the robotic platform 15, rotating the robotic platform 15, collecting data from a particular sensor of the plurality of sensors 20x, declaring a location of a source of gas in the environment 30, or a combination thereof.

Figure 10A:
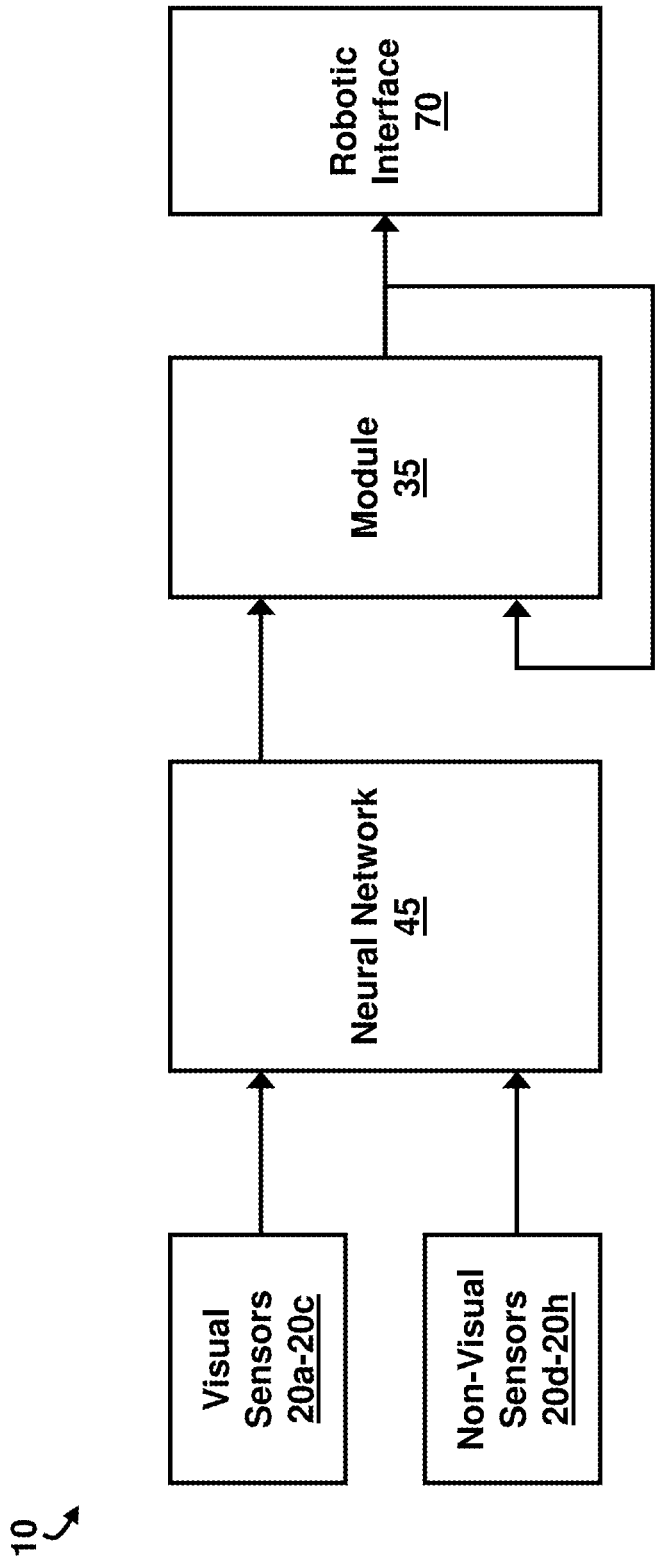
FIG. 10A is another block diagram illustrating the system of FIG. 1, according to an embodiment herein.
Figure 10B:
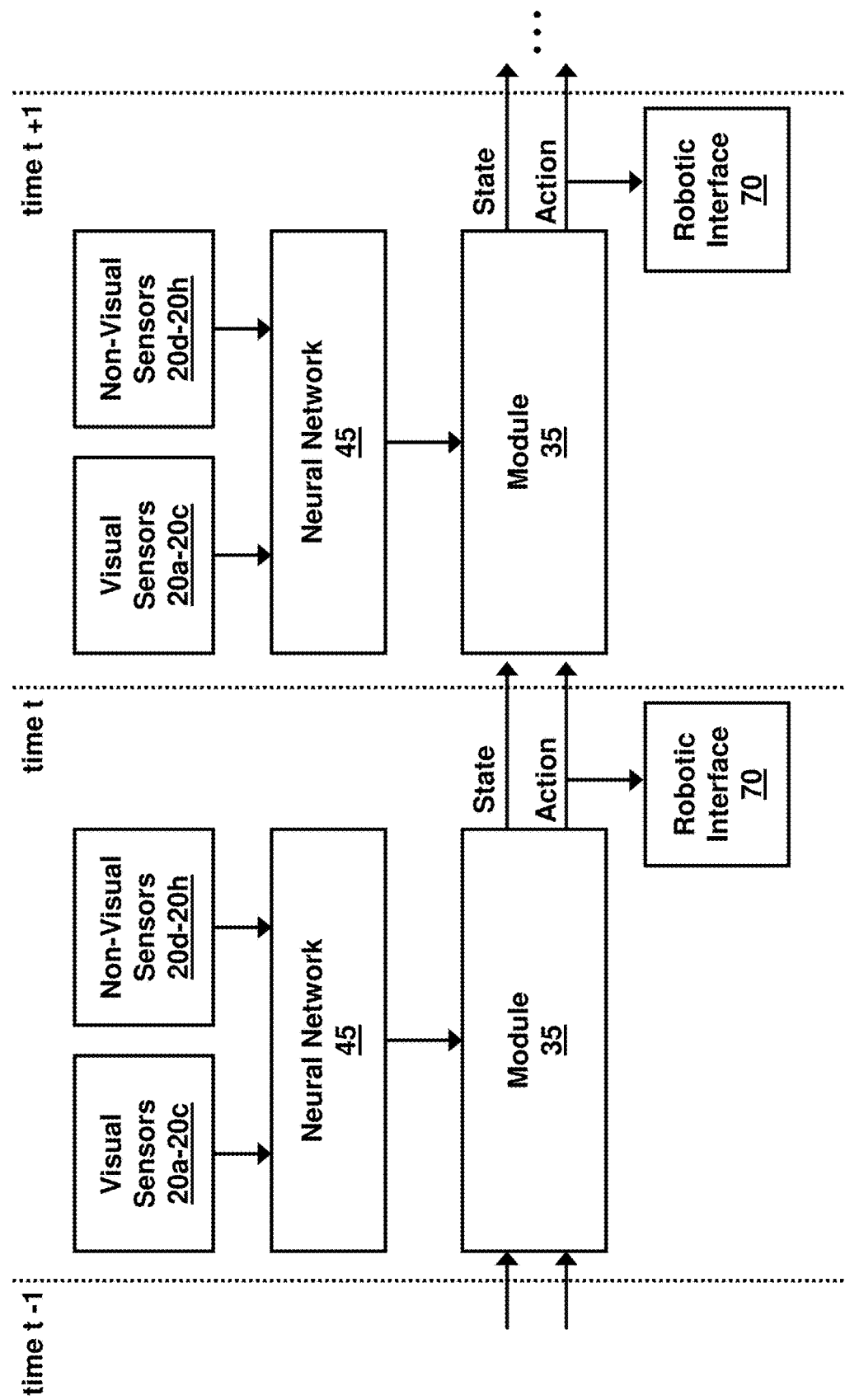
FIG. 10B is a block diagram illustrating the system of FIG. 10A over different time steps, according to an embodiment herein.

FIGS. 10A and 10B, with reference to FIGS. 1 through 9C, illustrate some other embodiments of the system 10. For example, the neural network architecture 45 integrates information from multiple sensory modalities (e.g., data 25 received from the plurality of sensors 20x). The module 35 may use this information and the history of observations and actions 55 to make the decision and to select the optimal action 60 under the user-defined constraints. The selected output may then be relayed to the robotic interface 70 and/or is sent to a human operator (e.g., user 120). FIG. 10B shows the system 10 over different time steps. At each time step, the system 10 receives the egocentric visual and non-visual sensory information (e.g., data 25 received from the plurality of sensors 20x) and keeps the history of internal states and actions 55 to guide the decision-making process at the next step, for example. Furthermore, at each time step, the neural network architecture 45, which may be embodied as a multi-modal encoder, for example, extracts the relevant data 25 from the plurality of sensors 20x and encodes them onto a joint embedding space 40, according to an example. The module 35 may utilize the extracted information from the environment 30 at the current step, the history of system states and the history of the actions 55 to calculate the optimal distribution over the actions 55 for the current time step. The module 35 can be parametrized using a deep-learning networks, such as, RNN (Recurrent Neural Network), LSTM (Long Short-Term Memory), or Transformer architecture. The entire system 10 may be trained to minimize the source localization time, while factoring in the measurement and the movement costs. For example, this forces the agent to solve a trade-off problem between exploration of the unseen areas to collect more information and exploitation of the already collected observations. The determined operational action 60 to be performed may include making different movements depending on the specific platform 15, making different observations, and declaring the target.

Figure 11A:
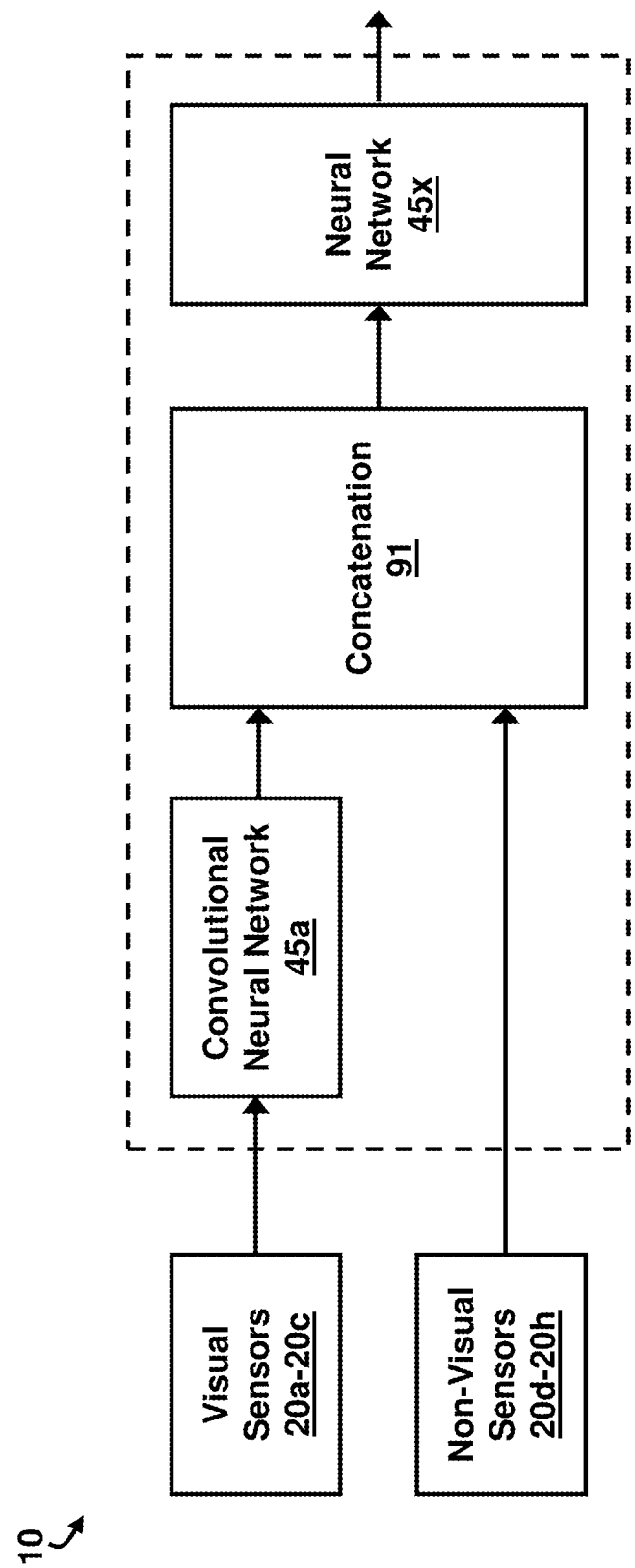
FIG. 11A is a block diagram illustrating a first implementation of the neural network architecture of the system of FIG. 1, according to an embodiment herein.
Figure 11B:
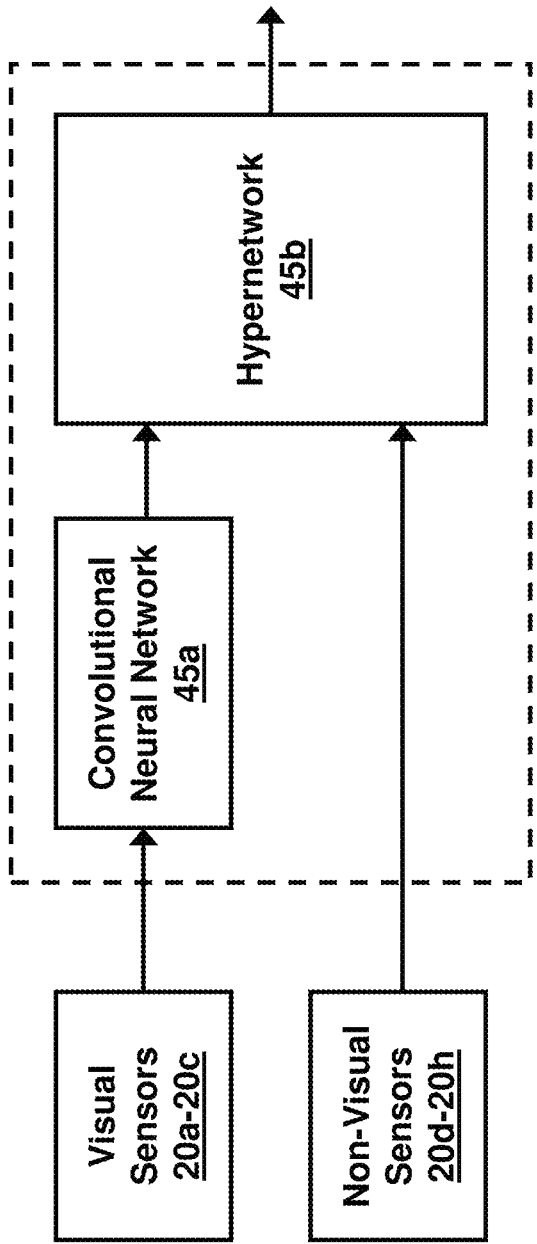
FIG. 11B is a block diagram illustrating a second implementation of the neural network architecture of the system of FIG. 1, according to an embodiment herein.
Figure 11C:
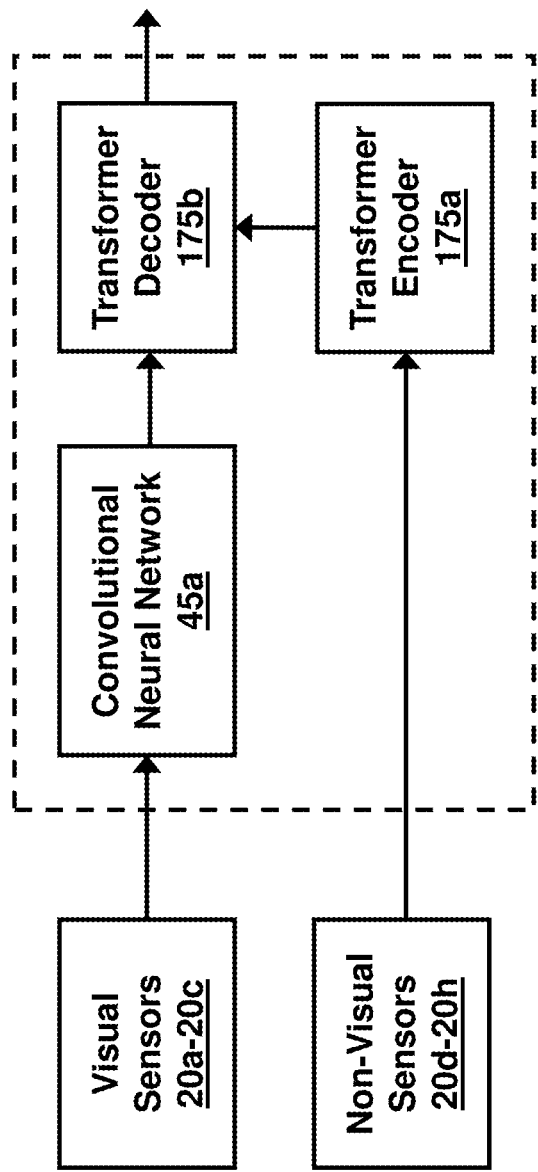
FIG. 11C is a block diagram illustrating a third implementation of the neural network architecture of the system of FIG. 1, according to an embodiment herein.

The neural network architecture 45 can be parametrized in a few different ways, as shown in FIGS. 11A through 11C, with reference to FIGS. 1 through 10B. Generally, FIGS. 11A through 11C depict different example implementations of the neural network 45. For example, FIG. 11A includes a convolutional neural network 45a that is used to extract features from the visual inputs 95. Then, the visual features 90 are concatenated 91 with non-visual features 25x and used as the input for another neural network 45x that extracts the relevant cross-modal information, according to an example. In FIG. 11B, instead of concatenation, a hypernetwork architecture 45b may be used to fuse the information from multiple modalities. In the example of FIG. 11C, an encoder-decoder transformer architecture (encoder 175a and decoder 175b) can be used to guide the visual attention of the decoder stream utilizing the non-visual cues.

In all the cases, a neural network 45 may be used to extract the visual features 90 from the visual sensory stream. Then, to fuse the information, the system 10 in FIG. 11A stacks the visual features 90 with the non-visual observations 80 and uses the neural network 45 to extract the relevant cross-modal information 92 and to map the concatenated information onto the joint embedding space 40, according to an example. In the hypernetwork architecture in FIG. 11B, a base neural network 45b processes the visual stream, however the non-visual sensor data 25x are used to generate the weights for the base architecture, in an example. It has been shown that hypernetworks are capable of effective and efficient multi-modal reasoning with fewer parameters, compared to conventional neural networks, according to an example. FIG. 11C shows an example transformer architecture where the sequence of recent visual features is fed to a decoder 175b and the sequence of recent non-visual observations 80 is fed to the encoder 175a. The encoder architecture 175a may utilize the history of observations to guide the attention of the decoder architecture 175b. This may enable the module 45 to employ the historical observations 55 to generate the final representation of the sensory information.

Figure 12:
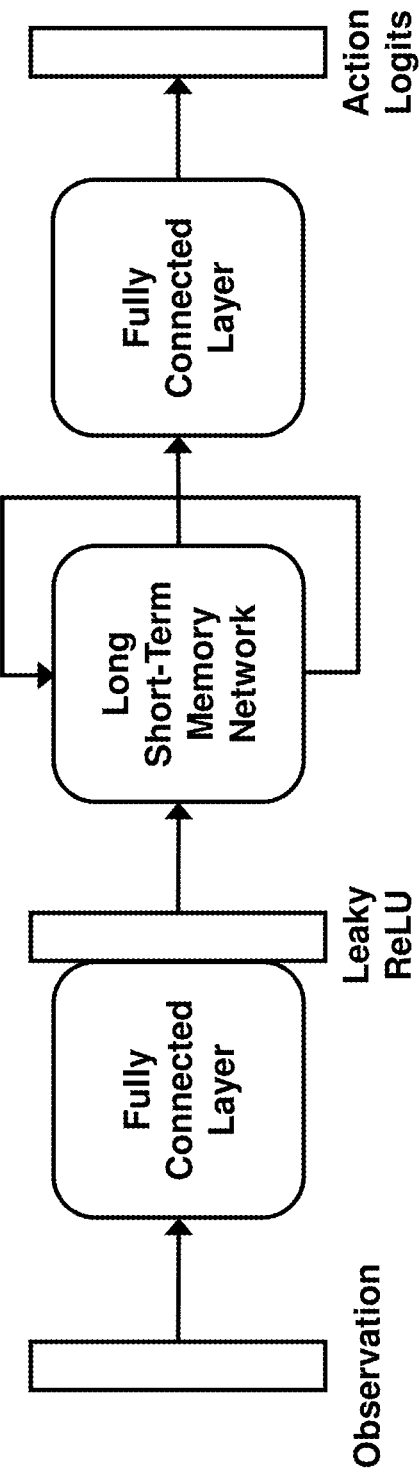
FIG. 12 is a block diagram illustrating the module of the system of FIG. 1 implemented as a deep reinforcement learning (DRL) model framework, according to an embodiment herein.

The module 35 may be configured as a deep reinforcement learning (DRL) model framework, as shown in FIG. 12, with reference to FIGS. 1 through 11C. While DRL has been widely used for policy learning on a variety of tasks, most of the work focuses on developing algorithms for Markov Decision Process (MDP), which assumes fully observable state space; i.e., the observation at each time step fully represents the state of the environment. However, in accordance with the embodiments herein and the application of threat localization, one cannot assume that the complete sequence of observations is available to the system 10 at any timestep. Therefore, the embodiments herein utilize the more complex Partially Observable Markov Decision Process (POMDP), according to an example, where the observation is assumed to be just a partial representation of the underlying state. This model assumes that one cannot directly observe the underlying state but instead receive an incomplete or noisy observation of that state. Partial observability may be due to limited sensing capability, or an incomplete system model resulting in uncertainty about full observability. The system 10 addresses this POMDP problem using a deep reinforcement learning architecture, called recurrent policy gradient (RPG), for example. The RPG is an extension of the policy gradient, in that it has recurrency embedded within the policy model architecture (such as an LSTM). This memory may enable the model to consider both the current observation and action, and the history of the past observations and actions 55.

In an example, the module 35 receives input from the neural network architecture 45, which includes the decision scores based on the imaging and chemical sensor data 25 at a given time instant. An effective threat detection process in dynamic environments may utilize an autonomous agent (e.g., such as a robotic platform 15) to not only integrate vision with chemical sensor streams but also adaptively collect and process the sensor data 25 in a manner that optimizes the search and localization of chemical threats and plume sources; e.g., by moving in the direction corresponding to increased chemical concentrations.

Therefore, using DRL, the embodiments herein may train the autonomous agent capable of active sampling and decision-making while receiving incomplete or noisy observations of the underlying system state. The framework may support a number of decision and control mechanisms that include but are not limited to threat search, plume navigation, threat classification and localization under time constraints, platform motion control, and optimal data collection.

Figure 13A:
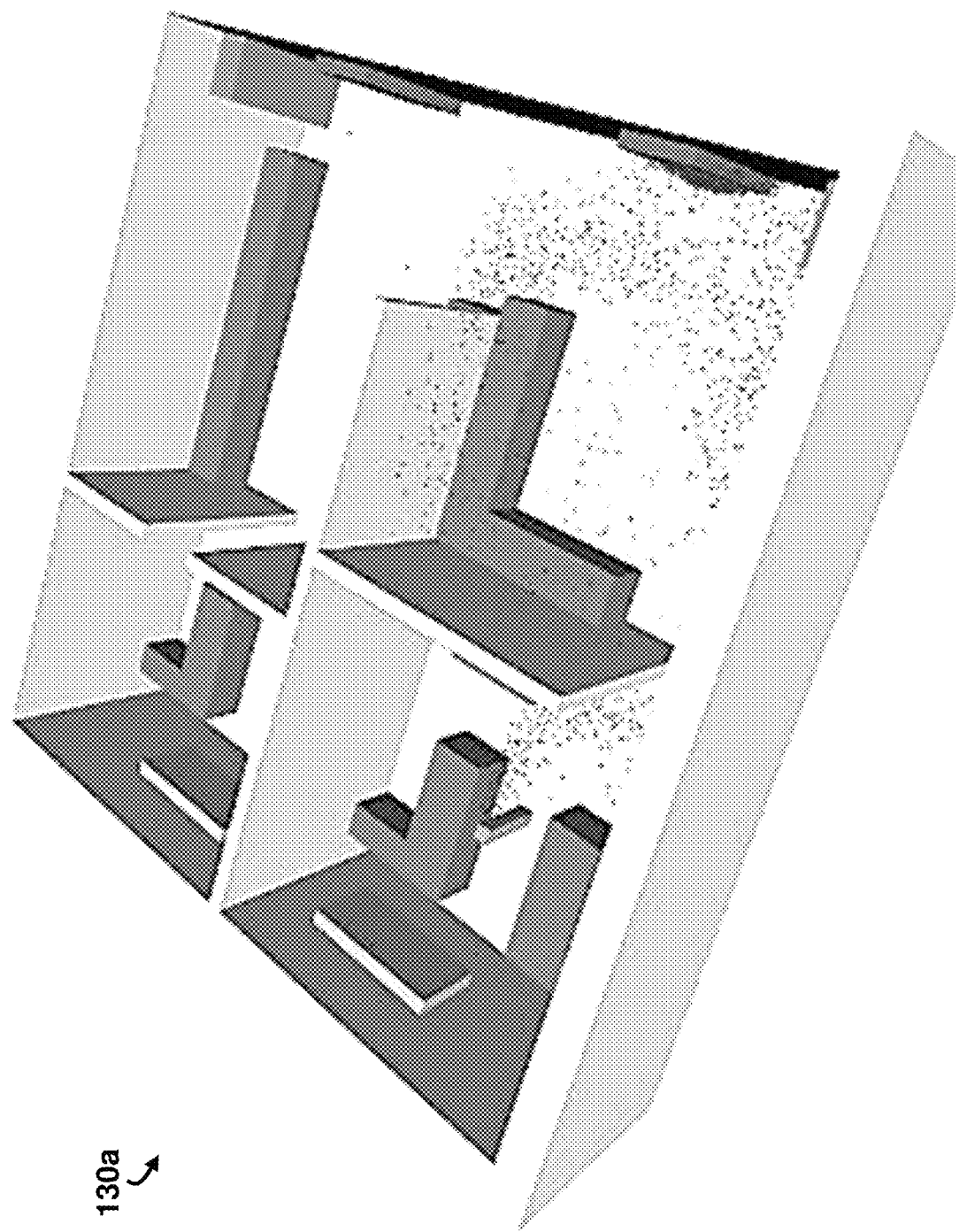
FIG. 13A is a schematic diagram of a first simulated environment to be sensed by the system of FIG. 1, according to an embodiment herein.
Figure 13B:
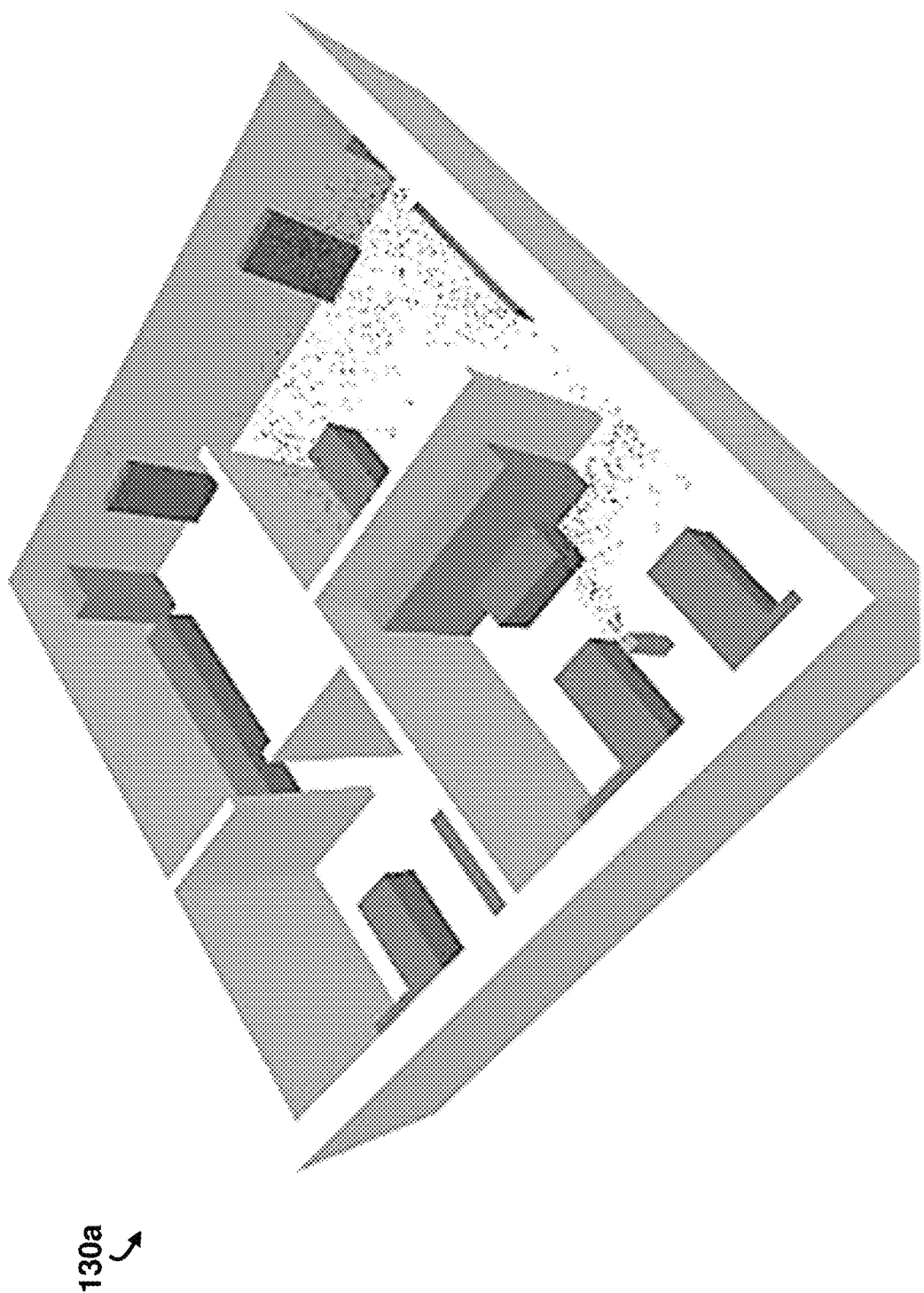
FIG. 13B is a schematic diagram of a second simulated environment to be sensed by the system of FIG. 1, according to an embodiment herein.
Figure 13C:
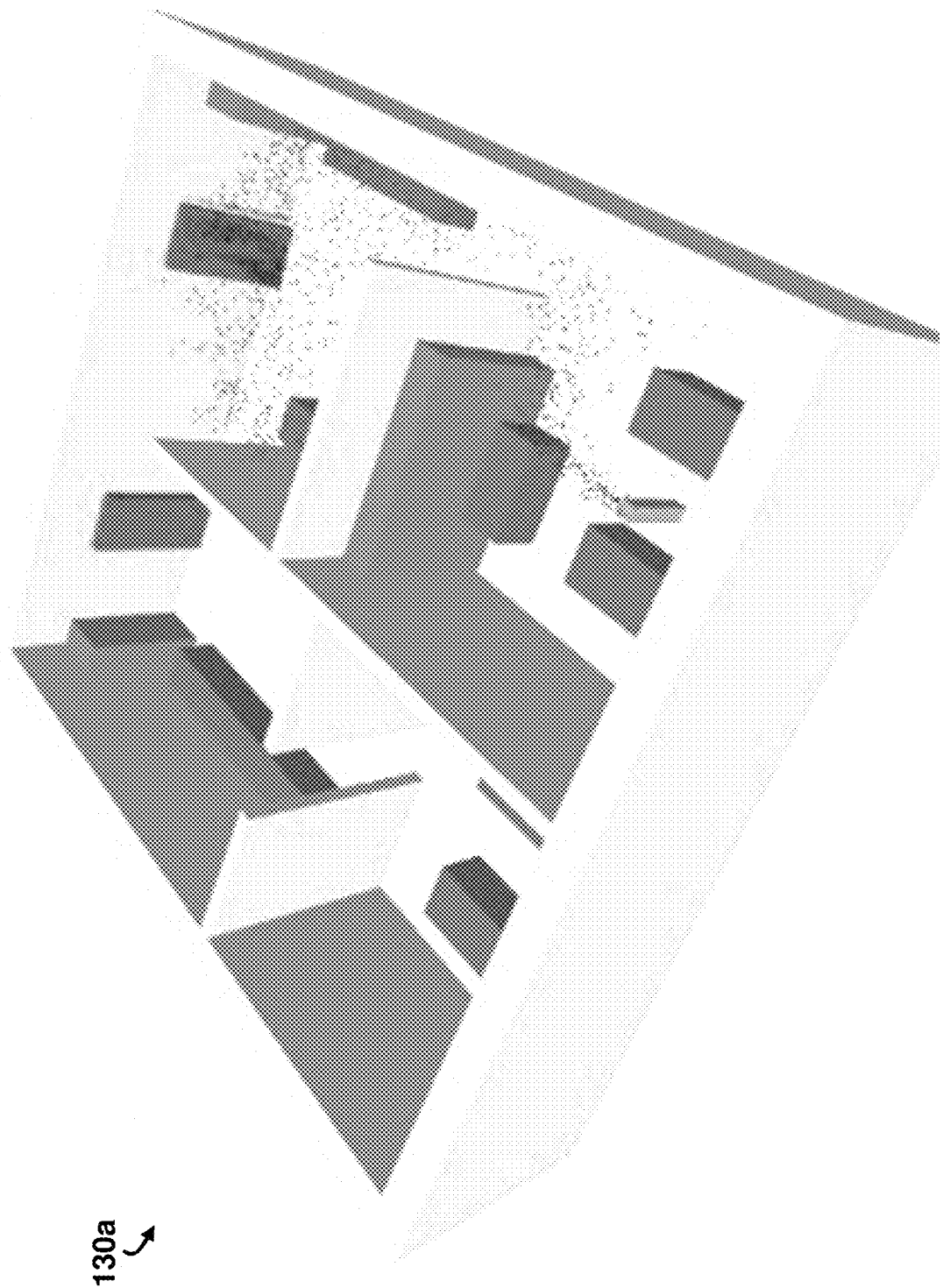
FIG. 13C is a schematic diagram of a third simulated environment to be sensed by the system of FIG. 1, according to an embodiment herein.
Figure 14:
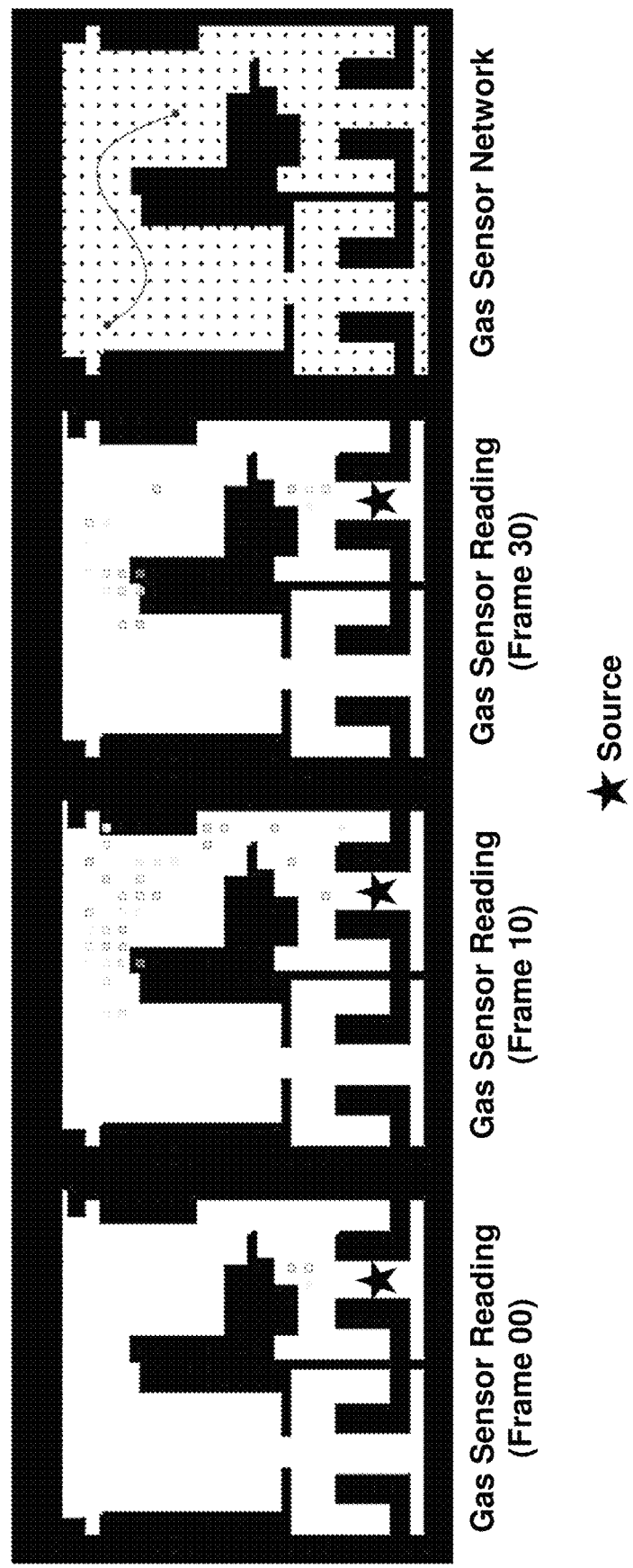
FIG. 14 are schematic diagrams of a mapped gas sensor network for sensing an environment by the system of FIG. 1, according to an embodiment herein.

The embodiments herein may further train the DRL models using simulation. More particularly, the simulated environment 130a may be used to train the DRL active search and localization system 10 that implements continuous interaction and feedback from the environment 30. A simulated gas release may simulate the diffusion and flow of a gas 145 through the environment 30, 130b with parameters such as wind, pressure, temperature, etc. FIGS. 13A through 13C, with reference to FIGS. 1 through 12, illustrate some example simulated environments 130a for gas release in an indoor environment. In order to define the action space, the environment state, and the reward functions for the processor 50, the results of the gas dispersion simulations may be integrated with commercially available reinforcement learning (RL) algorithms. Moreover, the DRL framework may be trained by treating the environment as a lookup table of gas concentration values at each point in space and time. The processor 50 can read this table at each time step and combine with previous readings using an exponential moving average. This produces a smoothly varying concentration that mimics the equilibration time of the physical sensors 20x, for example. FIG. 14, with reference to FIGS. 1 through 13C, illustrate the arrangement of many virtual gas sensors throughout a map and using compartmentalized bilinear interpolation allows us to obtain high-quality sensor estimates at any point in time and space which is used to train the DRL model, according to some examples.

The embodiments herein may also include tangible and/or non-transitory computer-readable storage media for carrying or having computer-executable instructions or data structures stored thereon. Such non-transitory computer readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a special purpose computer or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network. If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments herein is depicted in FIG. 15, with reference to FIGS. 1 through 14, according to an example. This schematic example drawing illustrates a hardware configuration of an information handling/computer system 400 in accordance with the embodiments herein. For example, the system 400 comprises at least one processor or central processing unit (CPU) 410. The CPUs 410 may be interconnected via system bus 412 to various devices such as a random access memory (RAM) 414, read-only memory (ROM) 416, and an input/output (I/O) adapter 418. The I/O adapter 418 can connect to peripheral devices, such as disk units 411 and tape drives 413, or other program storage devices that are readable by the system 400. The system 400 can read the inventive instructions on the program storage devices and follow these instructions to execute the methodology of the embodiments herein. The system 400 may further include a user interface adapter 419 that connects a keyboard 415, mouse 417, speaker 424, microphone 422, and/or other user interface devices such as a touch screen device (not shown) to the bus 412 to gather user input. Additionally, a communication adapter 420 may connect the bus 412 to a data processing network, and a display adapter 421 may connect the bus 412 to a display device 423, which may be embodied as an output device such as a monitor, printer, or transmitter, for example. Further, a transceiver 426, a signal comparator 427, and a signal converter 428 may be connected with the bus 412 for processing, transmission, receipt, comparison, and conversion of electric or electronic signals.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. An autonomous source localization system comprising:
a robotic platform comprising a plurality of sensors that collect visual, non-visual, and gas concentration data of an environment being sensed by the plurality of sensors;
a module that integrates the visual, non-visual, and gas concentration data into a joint embedding space using a neural network architecture, wherein the neural network architecture is based on a transformer architecture;
a processor to:
receive the joint embedding space from the module;

receive a history of system states and actions of the robotic platform wherein the history of system states and actions comprises a location and orientation of the robotic platform and previous actions taken by the robotic platform; and select an operational action for the robotic platform based on the joint embedding space, the history of system states and actions, and neural network inputs into the processor;

a robotic interface that causes the robotic platform to perform the operational action selected by the processor.

2. The system of claim 1, wherein the plurality of sensors comprise an RGB camera, an RGBD camera, a LIDAR sensor, a RADAR sensor, a gas concentration sensor, an airflow sensor, a GPS sensor, a SONAR sensor, or a combination thereof.

3. The system of claim 1, wherein the robotic platform comprises a virtual robotic platform.

4. The system of claim 1, wherein the robotic platform is to receive guidance instructions from the processor, and wherein the guidance instructions are input through a user-interface.

5. The system of claim 4, wherein the user-interface comprises a hand-held communication device configured to be operable by a user.

6. The system of claim 1, wherein the robotic platform is positioned on an unmanned aerial vehicle or a ground vehicle.

7. The system of claim 1, wherein the processor is to be trained using machine learning using reinforcement learning in a simulated environment or a real environment.

8. The system of claim 7, comprising a simulator that creates the simulated environment and generates observable data to train the processor, wherein the simulator simulates a diffusion and flow of gas through the simulated environment, and wherein the simulator mimics the robotic platform to interact with the simulated environment to collect simulated sensor data.

9. The system of claim 1, wherein the operational action selected by the processor comprises moving the robotic platform, rotating the robotic platform, collecting data from a particular sensor of the plurality of sensors, declaring a location of a source of gas in the environment, or a combination thereof.

10. The system of claim 1, wherein the processor is to identify a chemical compound in the environment being sensed based on the integrated joint embedding space, and wherein the chemical compound comprises toxic gases, biological agents, chemical agents, hazardous materials, or a combination therein.

11. An autonomous source localization system comprising:
a robotic platform comprising a plurality of sensors that collect visual, non-visual, and gas concentration data of an environment being sensed by the plurality of sensors;
a module that integrates the visual, non-visual, and gas concentration data into a joint embedding space using a neural network architecture, wherein the neural network architecture comprises an encoder-decoder architecture to (i) receive a sequence of historical non-visual and visual observations of the environment, and (ii) generate system actions;
a processor to:
receive the joint embedding space from the module;
receive a history of system states and actions of the robotic platform wherein the history of system states and actions comprises a location and orientation of the robotic platform and previous actions taken by the robotic platform; and
select an operational action for the robotic platform based on the joint embedding space, the history of system states and actions, and neural network inputs into the processor;
a robotic interface that causes the robotic platform to perform the operational action selected by the processor.

12. A method of performing autonomous source localization in an environment being sensed, the method comprising:
collecting visual, non-visual, and gas concentration data of the environment being sensed by a plurality of sensors on a robotic platform;
integrating the visual, non-visual, and gas concentration data into a joint embedding space using a neural network architecture, wherein the neural network architecture is based on a transformer architecture;
receiving a history of system states and actions of the robotic platform, wherein the history of system states and actions comprises a location and orientation of the robotic platform and previous actions taken by the robotic platform;
selecting an operational action for the robotic platform based on the joint embedding space, the history of system states and actions, and neural network inputs; and
causing the robotic platform to perform a selected operational action.

13. The method of claim 12, wherein the neural network inputs provide extracted visual features from visual sensory data received by the plurality of sensors.

14. The method of claim 13, wherein the neural network inputs are to fuse the visual features with non-visual data received by the plurality of sensors and extract cross-modal information.

15. The method of claim 14, wherein the neural network inputs are to map the fused information onto the joint embedding space.

16. The method of claim 12, comprising:
creating a simulated environment of the environment being sensed;
generating observable data from the simulated environment;
simulating a diffusion and flow of gas through the simulated environment; and
mimicking the robotic platform to interact with the simulated environment to collect simulated sensor data.

17. The method of claim 12, wherein the selected operational action comprises moving the robotic platform, rotating the robotic platform, collecting data from a particular sensor of the plurality of sensors, declaring a location of a source of gas in the environment, or a combination thereof.

18. A non-transitory computer-readable medium storing instructions for performing autonomous source localization in an environment being sensed, the instructions comprising:
collecting visual, non-visual, and gas concentration data of the environment being sensed by a plurality of sensors on a robotic platform;
integrating the visual, non-visual, and gas concentration data into a joint embedding space using a neural network architecture, wherein the neural network architecture is based on a transformer architecture;

receiving a history of system states and actions of the robotic platform, wherein the history of system states and actions comprises a location and orientation of the robotic platform and previous actions taken by the robotic platform;

selecting an operational action for the robotic platform based on the joint embedding space, the history of system states and actions, and neural network inputs; and causing the robotic platform to perform a selected operational action.

19. The non-transitory computer-readable medium of claim 18, wherein the instructions comprise:

providing extracted visual features from visual sensory data received by the plurality of sensors;

fusing the visual features with non-visual data received by the plurality of sensors and extract cross-modal information; and mapping the fused information onto the joint embedding space.

20. The non-transitory computer-readable medium of claim 18, wherein the instructions comprise:

creating a simulated environment of the environment being sensed;

generating observable data from the simulated environment;

simulating a diffusion and flow of gas through the simulated environment; and mimicking the robotic platform to interact with the simulated environment to collect simulated sensor data.

21. The non-transitory computer-readable medium of claim 18, wherein the instructions comprise selecting the operational action comprising moving the robotic platform, rotating the robotic platform, collecting data from a particular sensor of the plurality of sensors, declaring a location of a source of gas in the environment, or a combination thereof.

* * * * *